June 2, 1953

C. H. HUGHES 2,640,805

COMBUSTION CONTROL DEVICE FOR SOLE-FIRED
HORIZONTAL COKE OVENS

Filed March 16, 1950

INVENTOR.
CHARLES. H. HUGHES
BY
ATTORNEY

June 2, 1953 — C. H. HUGHES — 2,640,805
COMBUSTION CONTROL DEVICE FOR SOLE-FIRED
HORIZONTAL COKE OVENS Filed March 16, 1950

INVENTOR.
CHARLES H. HUGHES
BY
ATTORNEY

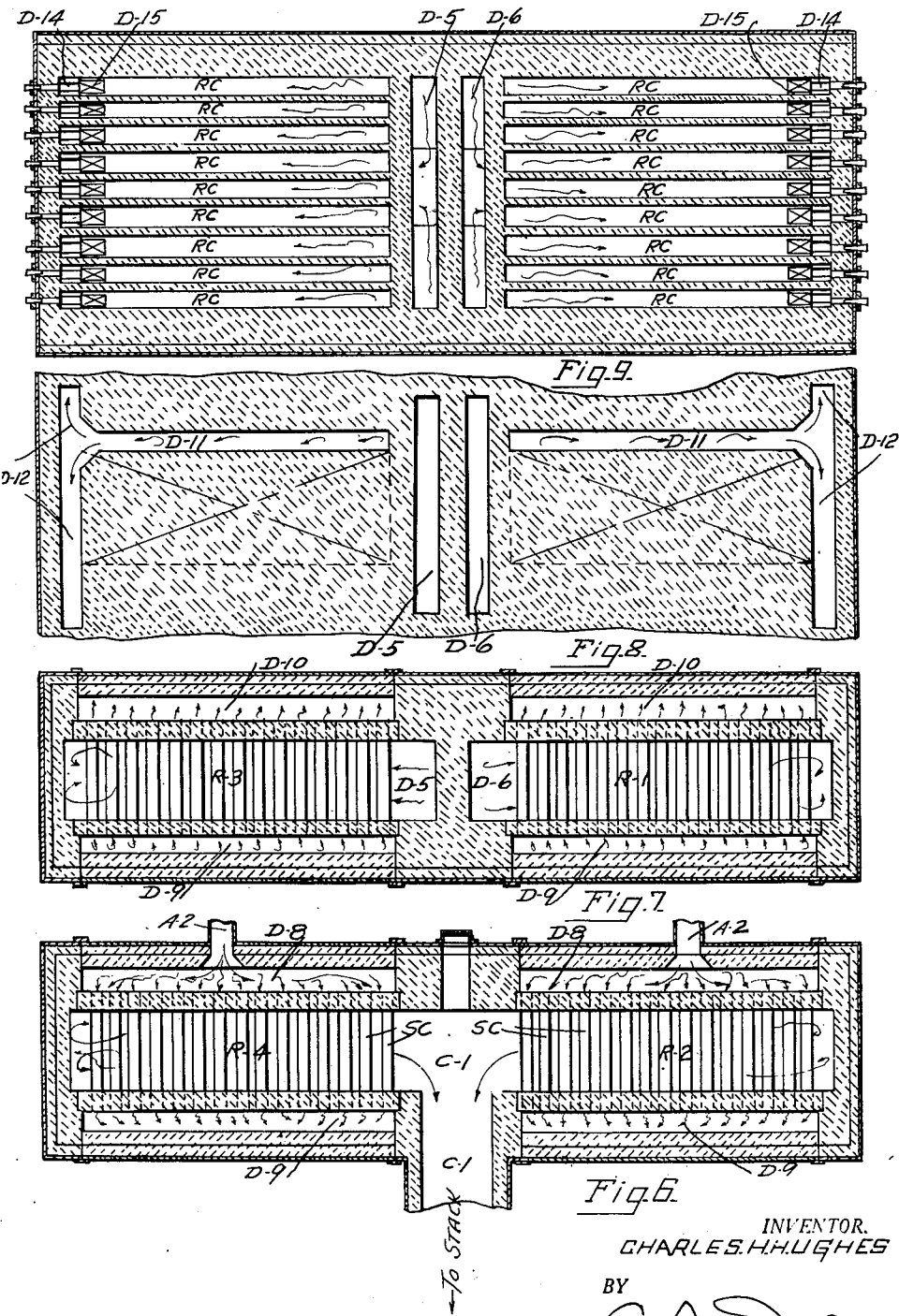

June 2, 1953 C. H. HUGHES 2,640,805
COMBUSTION CONTROL DEVICE FOR SOLE-FIRED
HORIZONTAL COKE OVENS
Filed March 16, 1950 11 Sheets-Sheet 5

INVENTOR.
CHARLES H. HUGHES
BY
ATTORNEY

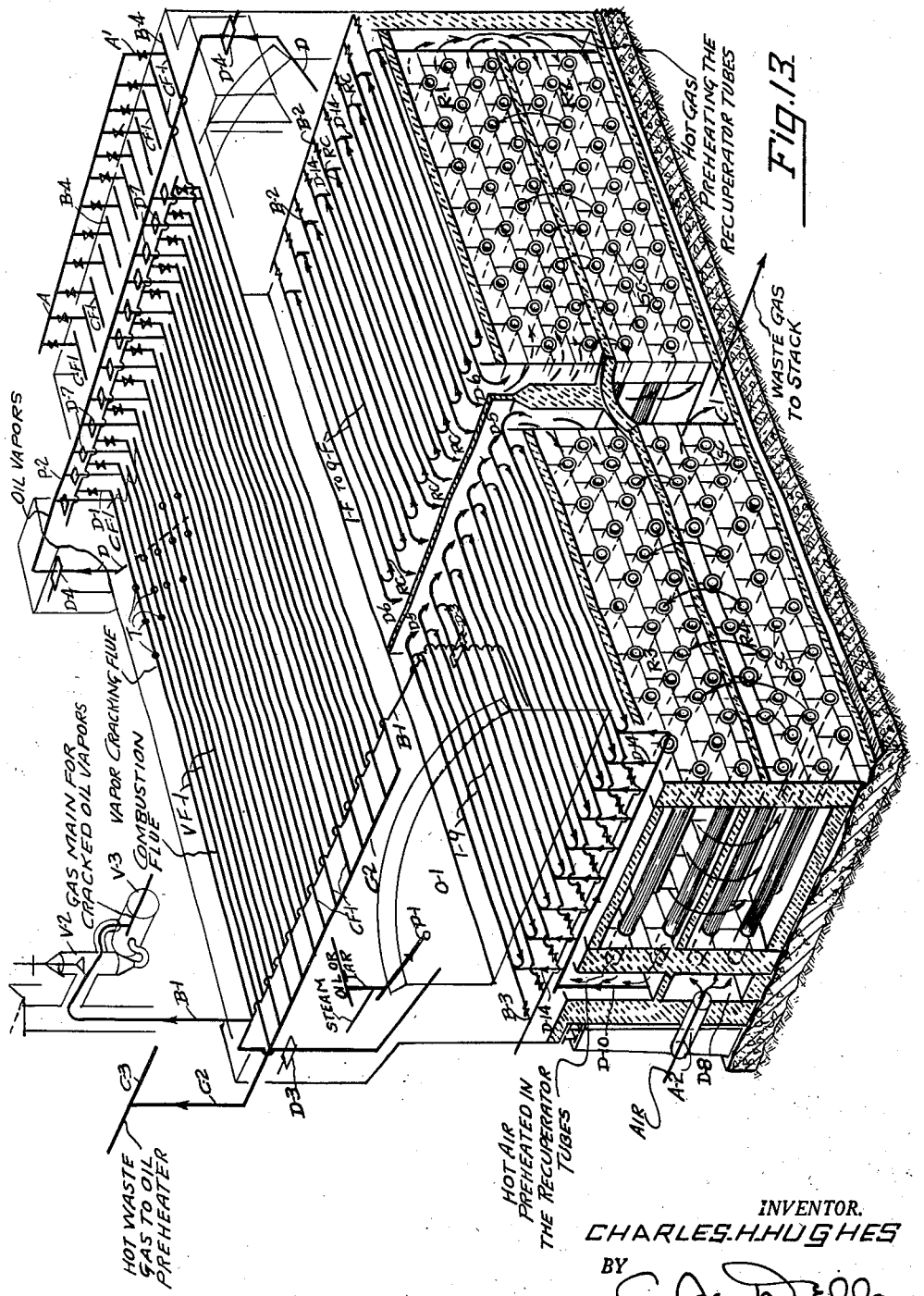

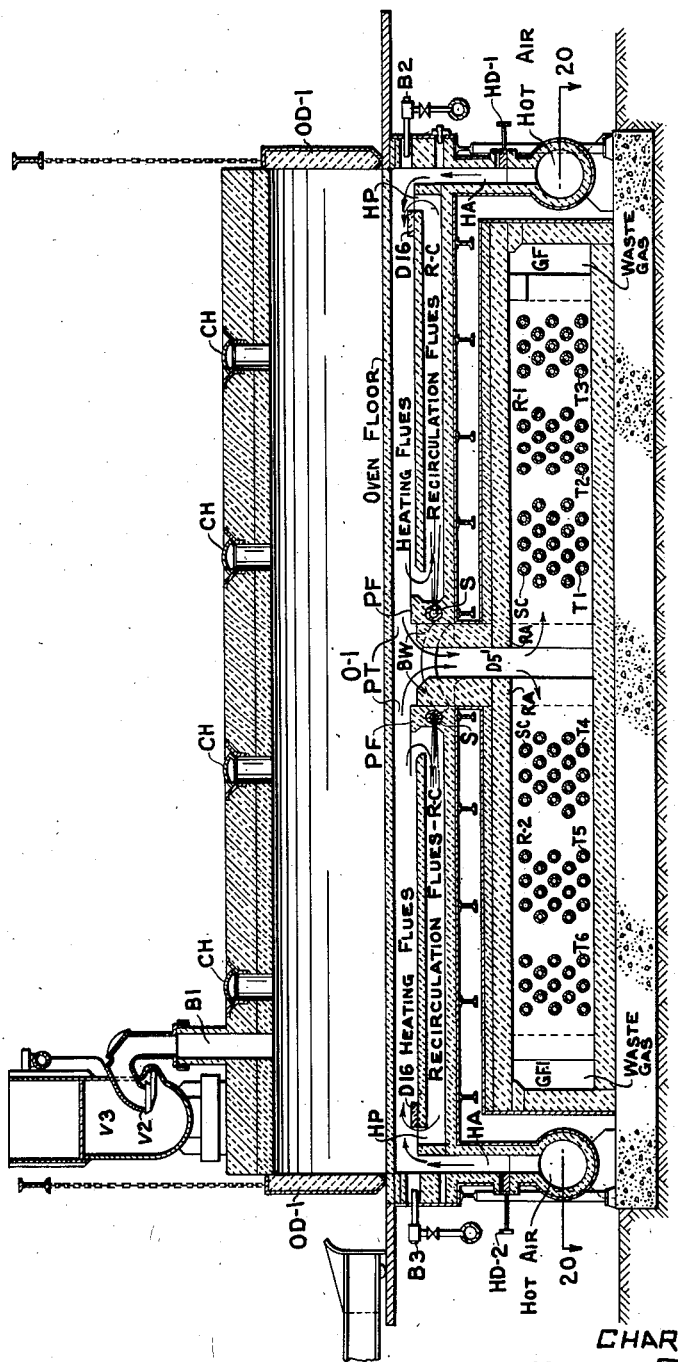

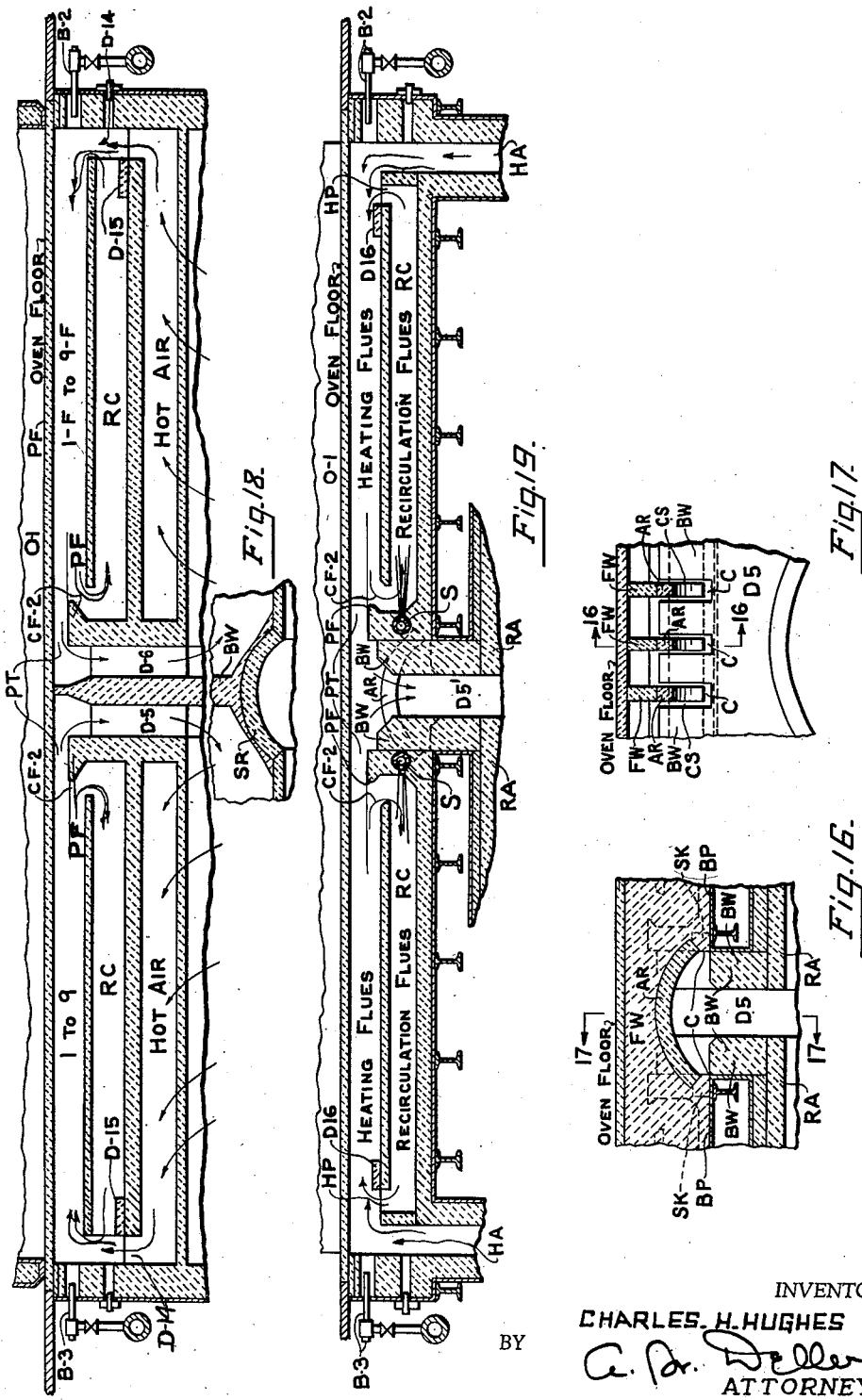

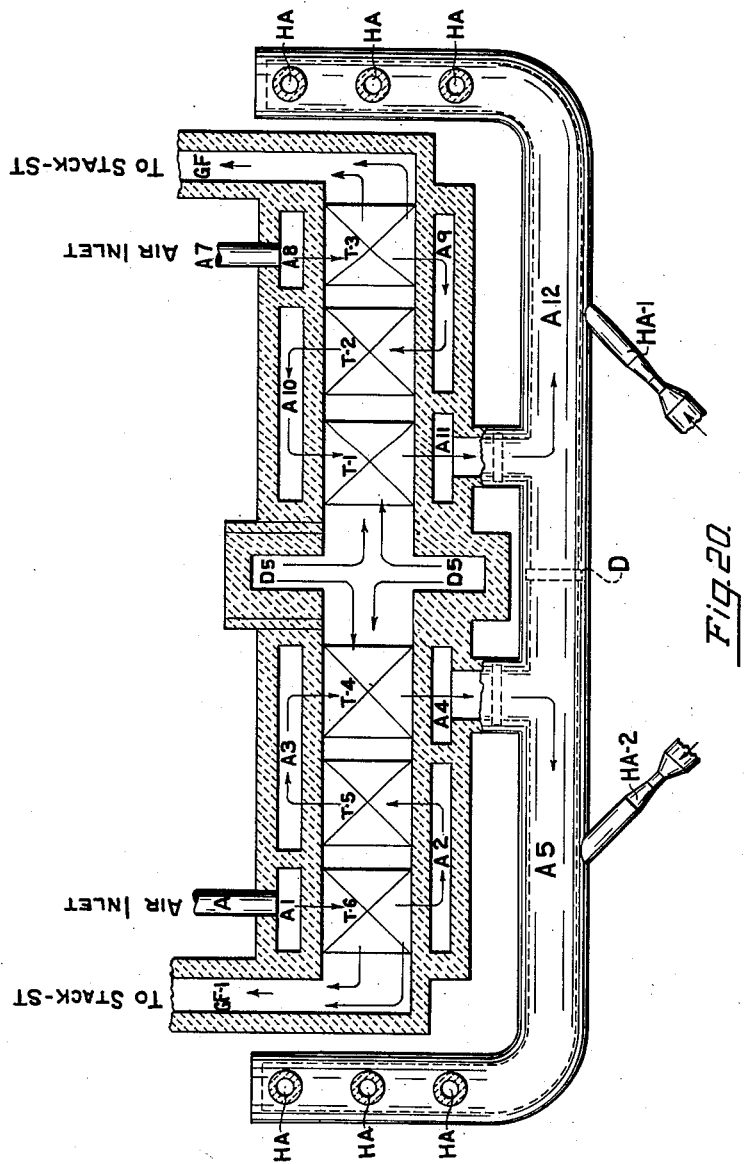

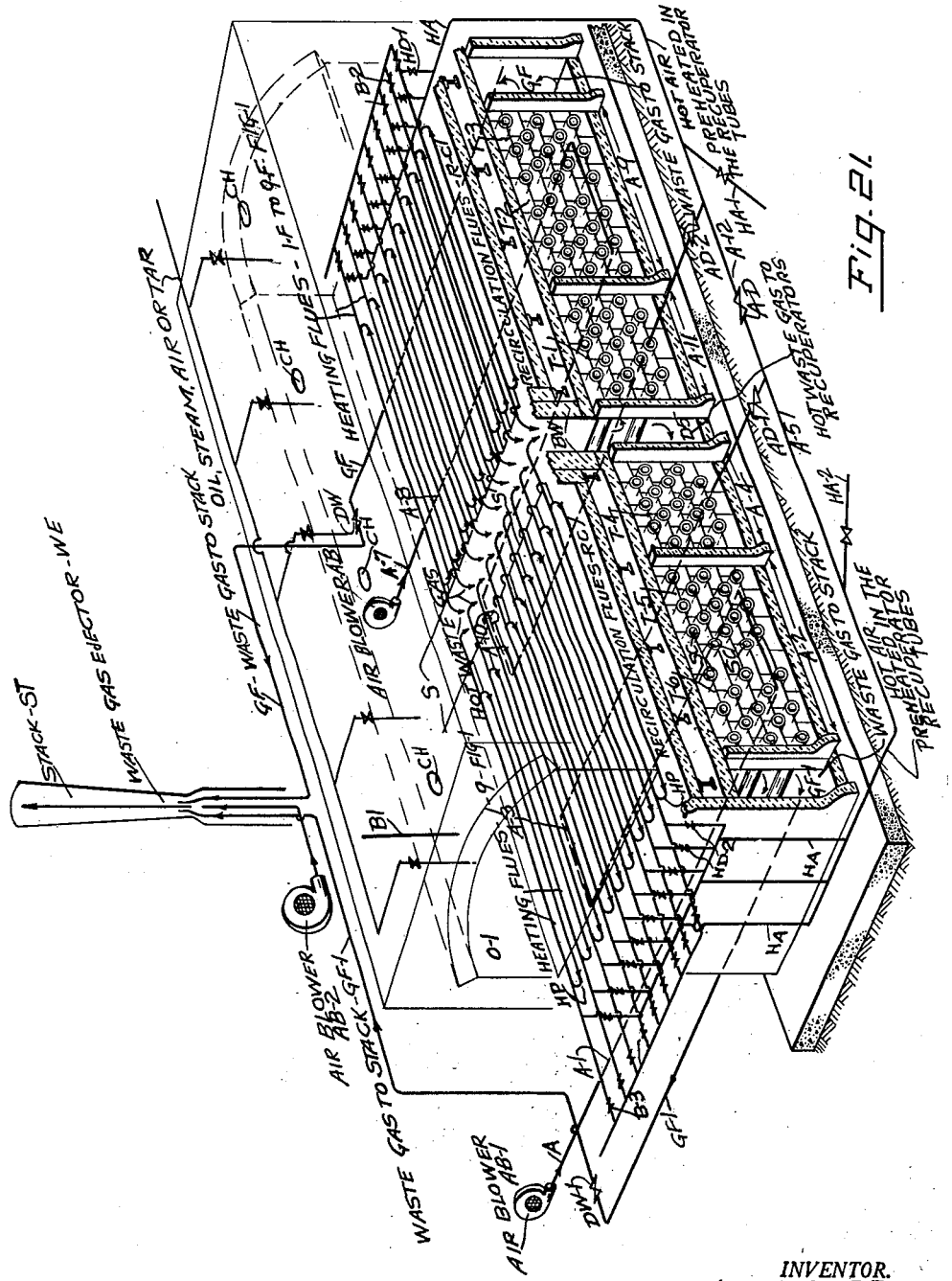

Patented June 2, 1953

2,640,805

UNITED STATES PATENT OFFICE 2,640,805

COMBUSTION CONTROL DEVICE FOR SOLE-FIRED HORIZONTAL COKE OVENS

Charles H. Hughes, Glen Ridge, N. J., assignor to Hughes By-Product Coke Oven Corporation, New York, N. Y., a corporation of New York Application March 16, 1950, Serial No. 150,052

10 Claims. (Cl. 202—102)

The present invention relates to the art of broad coke ovens, and, more particularly, to an improved method of operating a broad coke oven and to the pyrolytic treatment in a broad coking oven of straight chain hydrocarbons, such as paraffin hydrocarbons occurring in petroleum and the like, to convert them into aromatic hydrocarbons, such as benzol, toluol, xylol, naphthalene, anthracene, and the like, while evolving vapors containing straight chain hydrocarbons from a fluid hydrocarbon mass and carbonizing the residue thereof into an improved carbonized product, and to an improved broad coke oven provided with a recircuation flue and adapted to produce said carbonized product.

Heretofore, various methods have been used for the operation of broad coke ovens and for the conversion of hydrocarbons, particularly of the straight chain type, into other hydrocarbon reaction products, particularly of the aromatic or ring type. Generally speaking, such conversions were formerly conducted in a variety of apparatus, including stills, cracking units, etc. In recent years, attempts have been made to conduct the pyrolytic conversion of petroleum hydrocarbons in ovens, such as coking ovens of the broad type. Various difficulties were encountered in these attempts and unsuccessful results or unsatisfactory results were obtained, including failures in certain instances. The most serious difficulties encountered were the choking up of channels and conduits with carbon, carbon residues, soot, and the like, the production of low yields of aromatic hydrocarbons, the poor coking of the residue of fluid hydrocarbon masses, and the poor quality and low grade of the aromatic hydrocarbons and coke which were produced. In attempts at actual commercial operations of the pyrolytic conversion of hydrocarbons, the results obtained were so poor that the operations were discontinued and were given up as commercially inadvisable or as industrial failures. Although various endeavors were made to overcome the foregoing difficulties, none, as far as I am aware, has been wholly satisfactory for commercial operation conducted on a full industrial scale.

The present invention involves the discovery that in cracking hydrocarbon vapors evolved during the coking of petroleum residue, for instance, for the production of aromatic hydrocarbons, it is necessary to control not only the direction of flow of the vapors and the temperature of the cracking fluids, but also the space velocity and the turbulence of the vapors. It has likewise been discovered that a cracking oven having a special structure must be provided in order to properly carry out the pyrolytic conversion of hydrocarbons while at the same time heating fluid hydrocarbon masses to evolve hydrocarbon vapors and to carbonize the residue into good coke having acceptable qualities and properties.

It is an object of the present invention to provide for the pyrolytic conversion on a commercial or industrial scale of low cost hydrocarbon residual oils or the like to provide light oils, benzol, toluol, xylol and other aromatic hydrocarbons, together with coke, of a high quality and high yield.

It is another object of the invention to provide an improved method for the cracking of straight chain hydrocarbons and their conversion into aromatic hydrocarbons with a sufficiently high yield to warrent industrial operation.

A further object of the invention is to provide an improved method utilizing a new and improved combination of a coking oven and cracking chamber in which refractory materials including silicon carbide are employed within a single structure capable of heating a fluid hydrocarbon mass to evolve hydrocarbon vapors therefrom and to carbonize the resulting residue therefrom into coke, thereby effecting the pyrolytic treatment of the evolved vapors containing straight chain hydrocarbons and their conversion into aromatic hydrocarbons.

It is also within the contemplation of the invention to provide a new and improved method involving the use of a broad sole fired coking oven in which tar and carbon resulting from the pyrolytic treatment of hydrocarbons can be made into a high carbon coke having a true specific gravity of two or more, and especially suitable for the manufacture of carbon electrodes.

It is still a further object of the invention to provide an improved method using a cracking and coking oven of novel and improved design providing a heating system for the distillation of heavy petroleum, tar or the like and also a separate heating system within the same oven structure for the cracking of the oil vapors and the pyrolysis of paraffins for the production of aromatic oils and other aromatic hydrocarbons.

It is also an object of the invention to provide an improved method involving the use of a broad cracking and coking oven having the walls of the vapor flues constructed with uneven surfaces to produce turbulence of the oil vapors in such a manner as to cause the oil vapors to contact the hot wall surfaces, whereby effective pyrolytic treatment of hydrocarbons can be conducted.

Moreover, it is an object of the invention to provide a novel process employing a broad coking oven involving novel and improved combinations in which an increased and positive control of the flow and velocity of the oil vapors through the vapor flues is maintained, and in which positive control of the air to be preheated is provided, together with positive control of the waste gas from the oven, the said combinations involving an arrangement of structural elements which are capable of causing the air being heated to flow through horizontally-disposed recuperator tubes and of causing the waste gas which is being cooled to flow around the recuperator tubes, whereby uniformity of unidirectional flow and an effective change of temperature is imparted to the air from the sensible heat in the waste gases.

Furthermore, it is an object of the invention to provide an improved process utilizing a broad coking oven having a multiplicity of straight, independent heating flues extending parallel to the oven and divided on the center line of the oven, so that the heating flues connect on each side of the center line of the oven with two separate recuperators, thus providing for a continuous stream of the heating gases throughout the whole heating system from each flue burner to the recuperators and the stack.

The invention likewise contemplates the provision of a unique process using an oven structure in which novel recirculation flues are employed below each floor heating flue for the recirculation of the waste hot gases from each heating flue, for the purpose of providing more uniform heating of the oven floor by extending the flame length by means of the recirculated waste gases.

It is still another object of the invention to provide a novel process in which the recirculation of the waste gases passing through and around the flames from the floor burners reduces the flame temperature at the burners due to the presence of water vapor in the waste gas.

It is also within the contemplation of the invention to provide an improved process having a multiplicity of burners and heating flues under constant and uniform temperature without having to reverse the flow of the waste gases, through structural means for preheating the air and for recirculation of hot gases through the heating flues whereby a unidirectional flow of gases is maintained.

A further object of the invention is the provision of a novel process involving the charging of petroleum coke of low specific gravity into the oven and raising the floor temperature to produce a high temperature in the green coke to change the specific gravity to a gravity of about 2 plus and to convert the same to a satisfactory coke.

The invention further contemplates a novel combination of operations involving the charging of coking coal or other suitable solid carbonaceous material into the new oven and producing either domestic or metallurgical coke.

Still another object of the invention is to provide a unique process using an improved oven construction for the production of coke and the cracking of hydrocarbon oils, in which cracking flues are so located that a separate long heating flue is directly below and parallel to each individual cracking flue, and in which each oil vapor cracking flue is supplied with an air jet for the purpose of burning out any carbon which might collect in each oil vapor flue.

It is also within the contemplation of the invention to provide an improved broad coke oven having a recirculation flue combination incorporated therein whereby substantially uniform heating can be produced within the oven without overheating in the oven floor adjacent to the burners and underheating at the center or within central areas of the floor.

With these and other objects in view, the invention comprises the various features, operations and combinations hereinafter more fully described and more particularly defined in the annexed claims.

The novel process can be carried into practice in the improved sole fired broad coke oven which is illustrated in the accompanying drawings, in which:

Fig. 6 is a horizontal sectional view of the recuperators taken on the section line 6—6 of Fig. 1, in which the flow of waste gas and incoming air is indicated by arrows;

Fig. 7 depicts a horizontal sectional view taken on the section line 7—7 of Fig. 1, in which the flow of waste gas into the recuperators is indicated by arrows;

Fig. 8 is a horizontal sectional view taken on the section line 8—8 of Fig. 1, showing the flues connecting the air flues from the recuperators with the lower heating flues;

Fig. 9 illustrates a horizontal sectional view taken on the section line 9—9 of Fig. 1, showing the waste gas recirculation flues, in which the flow of the waste gas to the preheated air flues is indicated by arrows;

Fig. 13 illustrates a diagrammatic perspective view of my novel oven clearly showing the flow of gas, air, fuel, steam, oil or tar, etc., therein;

Figs. 14 and 15 are vertical longitudinal sectional views of a modified embodiment of the present invention showing recirculation flues combined with heating flues and an arch-supported, down-draft, hot waste gas, vertical ducts connected to recuperators;

Fig. 16 is a fragmentary, sectional view of the supporting arch over the down-draft, hot waste gas, vertical ducts shown in Figs. 14 and 15;

Fig. 17 depicts a sectional view taken on the line 17—17 of Fig. 16;

Figs. 18 and 19 are enlarged, fragmentary views, partly in section, of the recirculation flue systems illustrated in Fig. 1 and Fig. 14, respectively;

Fig. 20 illustrates a diagrammatic plan view showing the flow of air and gases through the recuperators and associated flues, etc.; and Fig. 21 is a diagrammatic perspective view of my novel oven clearly showing the flow of gas, air, and fuel, in such a manner as to illustrate the required continuous unidirectional stream of the heating gases throughout the whole heating system from each flue burner to the recuperators and the stack.

Broadly stated, the present invention contemplates the operation of a broad coke oven in a novel manner as well as the pyrolytic conversion of hydrocarbons for the production of aromatic hydrocarbons, such as benzol, toluol, xylol and the like, by the heat treatment of petroleum residues or other hydrocarbon oils, tars, or materials to produce hydrocarbon vapors or gases in the manner hereinafter more fully set forth. In accordance with the invention an improved broad coke oven is provided including an oven structure and cracking chambers or flues in which the pyrolytic conversion can be controlled within a temperature range to effect the desired conversion.

By controlling the direction of flow of the hydrocarbon vapors in the oven and through the cracking chamber, and by controlling the temperatures in the cracking chamber, while at the same time controlling the space velocity and turbulence of the vapors, relatively high yields of aromatic hydrocarbons can be obtained. In carrying the foregoing operation into practice, large quantities of gases are produced from the petroleum residue or the like under treatment, as well as tar and carbon which are converted into useful coke. All of the foregoing operations are conducted within a single refractory structure having a novel combination of cooperating elements by which improved results are obtained, eliminating certain operating difficulties of prior operations and substantially reducing the cost of manufacture of the products obtained thereby. A high yield of aromatic hydrocarbons and the production of electrode coke can be obtained by the processing of about 4 degree to about 8½ degree API residuum oil, for example, by charging the oil into the oven at about 700° F. and cracking the hydrocarbon vapors produced therefrom at a temperature of about 1350° F., for instance, in the cracking chamber, or cracking flues, hereinafter described and the subsequent recovery and separation of components of the reaction produced.

Figure 2:
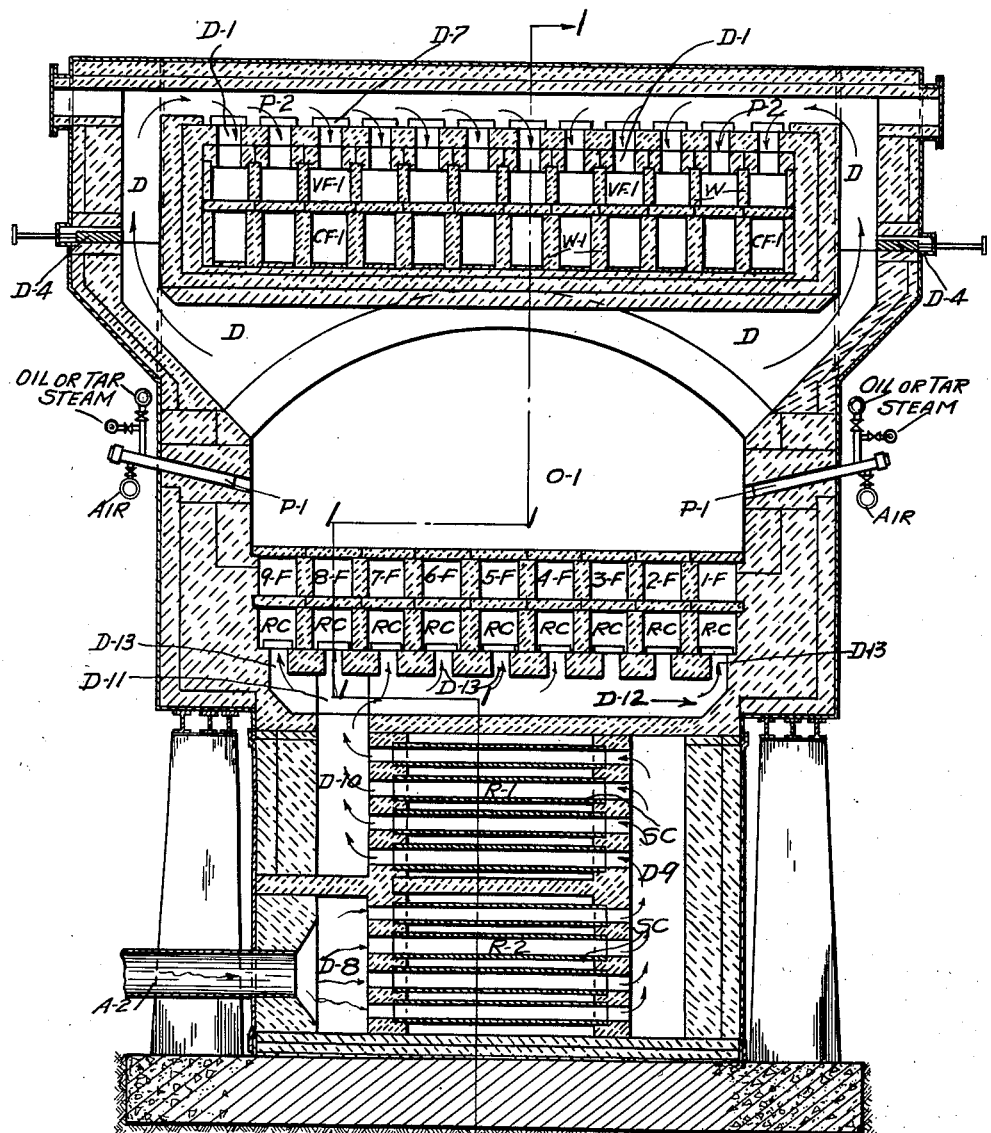
Fig. 2 illustrates a vertical cross-sectional view of a broad coke oven showing the vertical recuperators' lower heating system, waste gas recirculation flues, upper heating flues, flues in which the oil vapors are cracked, the air supply to the recuperators, and the air and oil ports leading into the oven.

The single novel structure or apparatus employed in carrying out the pyrolytic conversion of the hydrocarbons includes a broad cracking and coking oven which, in a commercial installation can be about 42 feet long and about 10½ feet wide, being rectangular at the base of the oven and arched in the manner shown more particularly in Fig. 2 of the drawings, which is combined with a heating system adapted to operate with either rich fuel gas, such as coke oven gas, oil gas, or with liquid fuels, such as fuel oils, tars, and the like, and which can be combined with preheated air from recuperators and mixed with recirculated hot waste gases. Housed within the upper part of the oven structure is a cracking chamber provided with an independent heating system which can be so controlled as to obtain the desired temperature in the floor and side walls of the oil cracking flues. The entire brick work structure is preferably encased in a metal shell, such as a welded steel casing, whereby the interior of the oven may be operated under pressure or under sub-atmospheric pressure, as desired.

Generally speaking, the oven heating system below the oven floor preferably consists of any suitable number of flues, depending upon the oven width employed, the flues being preferably arranged longitudinally of the oven to support and heat the floor thereof. Each longitudinal flue is preferably divided at its transverse center line so that the waste gas from each half flue is diverted into the recuperators situated below and parallel to the corresponding half of the oven. The two sets of horizontal recuperators located below and parallel to the oven and to the heating flues are in constant use during the operation of the apparatus to supply heated air to opposite ends of the floor heating flues and to constantly receive the hot waste products of combustion which, in turn, pass to the oven waste-gas stack.

Referring more in detail to the drawings, it will be understood that the novel cracking and coking oven embodying my invention comprises an arched rectangular broad coking chamber O-1, in which the fluid hydrocarbon mass, such as oil residue, tar or the like, is heat treated and distilled, leaving carbon, which is one of the products of the reaction or heat treatment, on the oven floor to be coked. Superimposed upon the coking chamber are flues VF-1, in which vapors from the mass of fluid hydrocarbons are heat treated. The hot oil or tar is charged into the coking chamber O-1 through charging ports P-1 in both sides of the side walls of the oven. The oil vapors pass from the coking chamber O-1 through damper-controlled off-take ducts D, at both sides of the oven, into a top plenum chamber P-2, and thence through ducts D-1, controlled by dampers D-7, into vapor heat-treating flues VF-1, and out of the oven structure through breeching B-1 and wash-oil valve V-2, into a vapor flue V-3 to a conventional or standard by-product recovery apparatus well known to those skilled in the art.

At the beginning of the distillation process, for a period of perhaps ten to twenty minutes, it is desirable to take off the uncracked heavy oil vapors through a duct D-2 (see Fig. 3) at each side of the oven, the ducts being provided with dampers D-3 which control the passage of the vapors into the vapor breeching B-1. The flow or travel of the oil vapors at the start of the oven operation can be controlled by closing the dampers D-4 (see Fig. 2) in both of the ducts D, the dampers D-3 (see Fig. 3) in both of the ducts D-2 being open, thus permitting the vapors to flow directly to the breeching B-1, through the wash-oil valve V-2, to the vapor main V-3, and from thence to the by-product recovery apparatus. After the floor of the oven is covered with the hydrocarbon oil or tar to be treated, and coking has started, dampers D-4 in both of the ducts D may be opened, and the dampers D-3 in both of the ducts D-2 can be closed. The flow or travel of the oil vapors then takes place through the oil cracking vapors flues VF-1 to the breeching B-1, through the wash-oil valve V-2, to the vapor main V-3, and to the by-product recovery apparatus. During the entire oil cracking operation, the oven is sealed against the admission of air by means of oven doors OD-1, provided at the coke pusher end (see left end in Fig. 1) and also at the coke discharge end of the oven.

Figure 3:
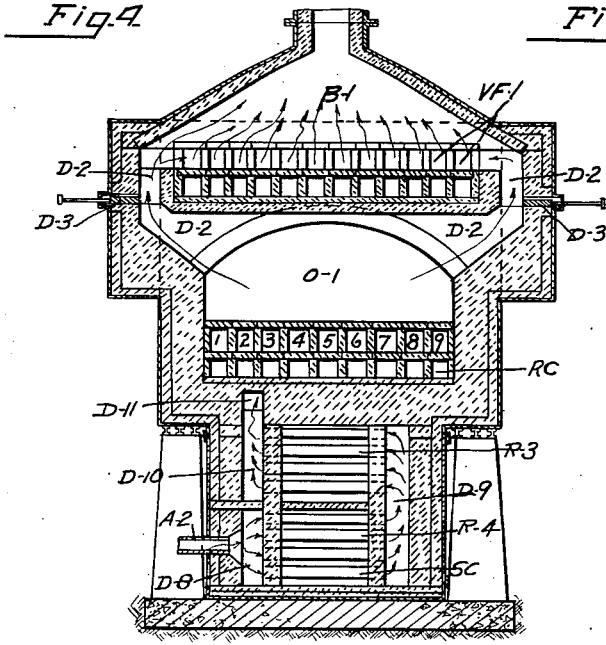
Fig. 3 depicts a vertical cross-sectional view taken on the section line 3—3 of Fig. 1, in which the flow of air is indicated through the tubular recuperators by means of arrows, and the flow of oil or other hydrocarbon vapors directly from the oven to the vapor off-take is also indicated by means of arrows.

Beneath each half of the broad coking chamber O-1 (see the left and right halves, referring to Fig. 1) and running parallel to the length thereof are heating flues 1, 2, 3, 4, 5, 6, 7, 8, and 9 (see the left half of Fig. 1, and Fig. 3) and 1-F, 2-F, 3-F, 4-F, 5-F, 6-F, 7-F, 8-F, and 9-F (see the right half of Fig. 1 and Fig. 2), which are preferably arranged horizontally, and each half flue is preferably independent of the adjoining flues. The flues are separated from each other by longitudinal partition walls as is indicated in Figs. 2 and 3 of the drawings. The heating flues 1 to 9 (Fig. 3) and 1-F to 9-F (Fig. 2) are provided at the outer ends thereof with suitable heating means, such as gas burners B-2 and B-3 (see Fig. 1), which can be supplied with fuel in a manner to be hereinafter described. Below each floor heating flue is a recirculation flue RC, for the recirculation of hot waste gases from and to each floor heating flue, so as to produce, during the operation of the apparatus, a long flame and to provide uniform heating of the oven floor.

Below the recirculation flues RC on each half of the oven are located two sets of recuperators R-1, R-2, and R-3, R-4, the recuperators R-1 and R-2 being in series, and R-3 and R-4 being also in series, but the two sets in series operate independently of each other, as will be apparent from the detailed description of the operation of the apparatus hereinafter more fully set forth. The tubes of the recuperators are preferably constructed of silicon carbide, which permits a very rapid and almost instantaneous transfer of the sensible heat from the hot waste gas through the wall of the tubes to the air to be preheated.

Figure 1:
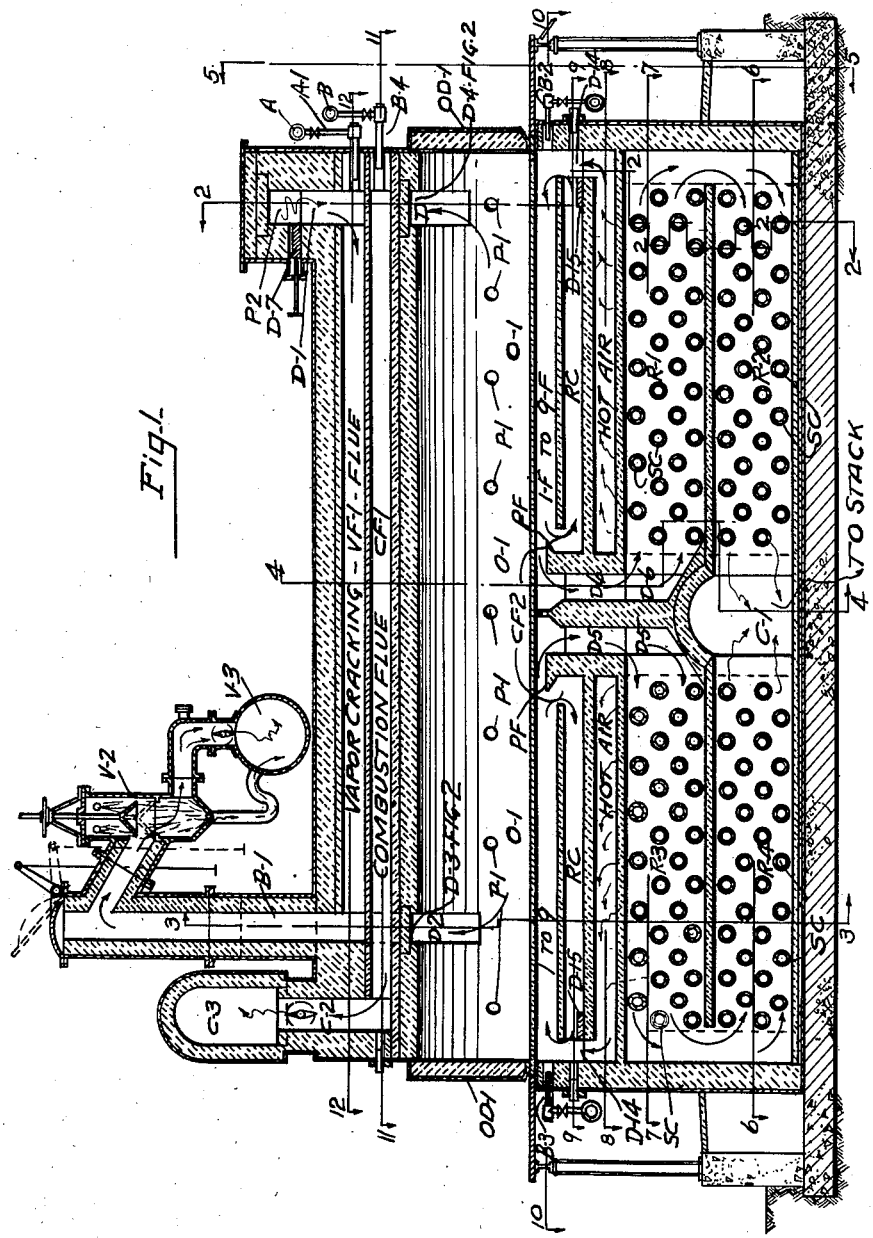
Fig. 1 is a vertical longitudinal sectional view showing a broad coking oven, tubular recuperators, upper heating flues, lower heating flues, waste gas recirculation flues and other flues in which the oil or other hydrocarbon vapors are cracked, gas manifolds, and piping to the upper and lower longitudinal heating systems, waste gas outlets and cracked oil vapor off-takes.
Figures 4, 5:
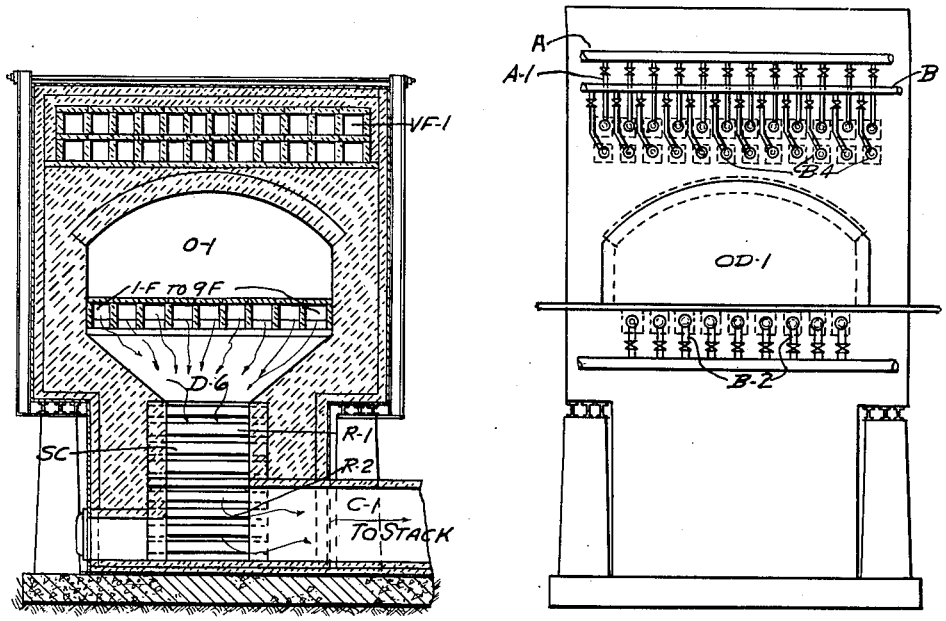
Fig. 4 is a vertical cross-sectional view taken on the section line 4—4 of Fig. 1, in which the travel of the waste gases from the lower heating system into the recuperator is indicated.
Fig. 5 shows an end view of the oven from the right in Fig. 1, taken from the section line 5—5, showing the gas piping to the lower and gas and air piping to the upper heating system, and air pipe connections to the vapor cracking flues.

The recuperator R-3 is connected with the floor heating flues 1 to 9, inclusive, through ducts D-5 (see Fig. 1), and the recuperator R-1 is connected with the floor heating flues 1-F to 9-F, inclusive, through ducts D-6 (see Fig. 1). The recuperators R-2 and R-4 are connected with the waste gas flue C-1 (see Fig. 1 and Fig. 4).

It will be understood that the portion of the oven heretofore described in detail relates to the lower half of the oven unit, which is used primarily for the distillation of the hydrocarbon oil or tar and for the coking of the residue. The upper portion of the oven is designed particularly for the treatment of oil vapors from the hydrocarbon oil or tar to effect cracking or the pyrolytic heat treatment of the hydrocarbon vapors for the production of aromatic oils or compounds. The oven sections or parts are designed to be operated as a single unit, but the oil vapor cracking flues VF-1 may be closed off, if desired, by means of dampers D-4 (see Fig. 2) and the oven may then be operated solely as a distillation and coking oven for the production of coke and high B. t. u. oil gas.

Figure 12:
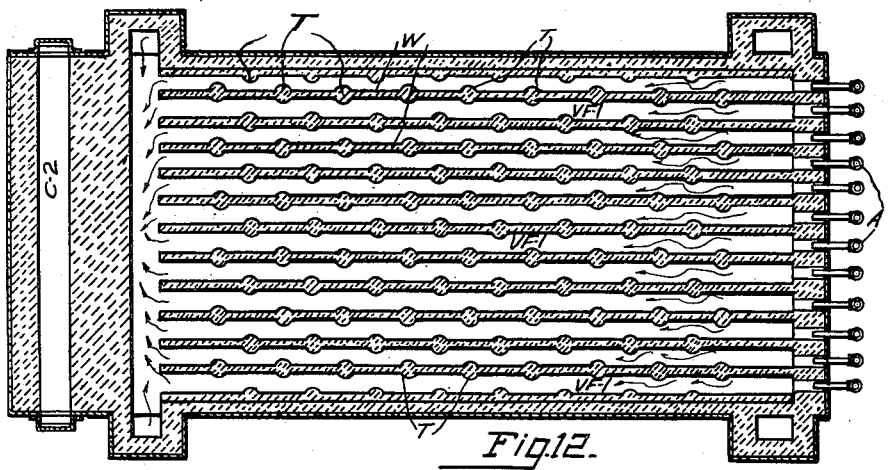
Fig. 12 shows a horizontal sectional view taken on the section line 12—12 of Fig. 1, showing the oil vapor cracking flues extending longitudinally of the oven, the view showing in detail the irregular surfaces of the cracking flues.

The heat-treating flues VF-1 (see Figs. 1, 2, 4, and 12) which may consist of any desired number of flues, as may be required to handle the volume and velocity of the oil vapors produced, are preferably arranged horizontally, or in a horizontal position longitudinally of the oven, and may be separated from each other by longitudinally arranged silicon carbide partition walls W (see Fig. 12), each of which has a multiplicity of projections T which serve to cause turbulence of the oil vapors during passage of the vapors in contact therewith and to produce more intimate contact with the wall surfaces.

Figure 11:
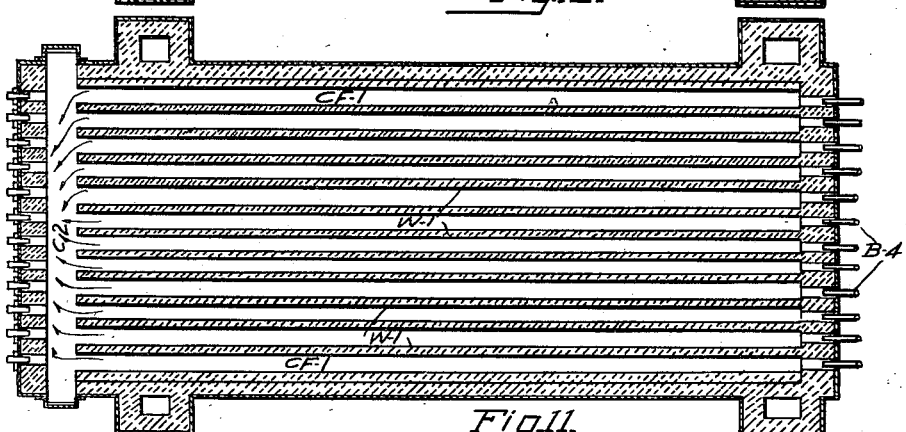
Fig. 11 depicts a horizontal sectional view taken on the section line 11—11 of Fig. 1, showing the longitudinal flues of the upper heating system directly below the floor of the oil vapor cracking flues.
Figure 10:
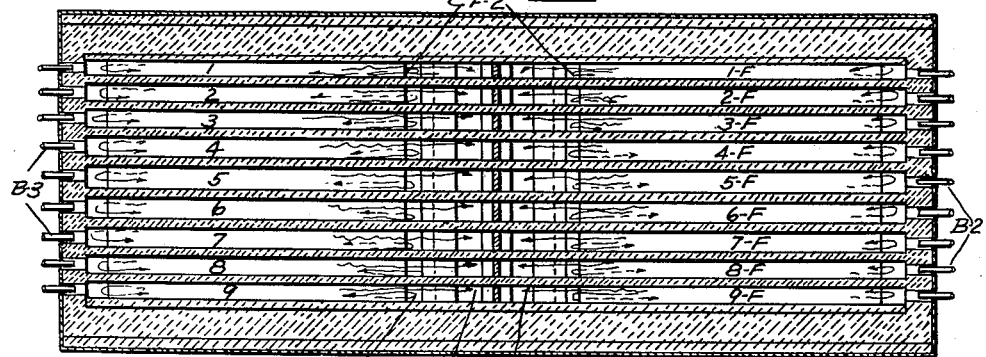
Fig. 10 is a horizontal sectional view taken on the section line 10—10 of Fig. 1 directly below the floor of the oven and showing the lower heating flues.

Each duct D-1 is preferably provided with regulating dampers D-7 (see Figs. 1 and 2) for the purpose of controlling the volume of oil vapors from the plenum chamber P-2 to each of the vapor cracking flues VF-1. Each vapor flue is preferably provided with an air inlet A-1 from a manifold A for burning carbon in the cracking flues. Beneath each vapor cracking flue, and arranged in a horizontal position longitudinally of each vapor flue VF-1, is a heating flue CF-1 (see Figs. 1, 2, and 11). These heating flues CF-1 are preferably single and are separated by partition walls W-1, as shown in Fig. 11. Each heating flue is preferably provided with a separate gas or oil burner B-4, which may be supplied with gas or oil from a manifold B. The products of combustion from all of the heating flues CF-1 discharge into a flue C-2 (see Figs. 1 and 11) and through a stack flue C-3 to a waste-heat boiler, or to the atmosphere, as desired.

When hydrocarbon vapors from the charge of residue oil or tar have been evolved and there are substantially no more vapors to heat-treat in the flues VF-1, and the carbonaceous residue has been thoroughly coked, then the coke product is ready to be pushed from the oven into a standard quenching car or other suitable container.

The recirculation of gases through the apparatus is as follows:

Hot waste gas from the floor heating flues 1 to 9 inclusive at the left side of the oven in Fig. 1, flows through ducts D-5, then around the silicon carbide tubes SC in the recuperator R-3, then around the tubes SC in the recuperator R-4 and into the stack flue C-1. Simultaneously, hot waste gas from the heating flues F-1 to F-9, inclusive, at the right side of the oven in Fig. 1, flows through the ducts D-6 into the recuperator R-1, around the silicon carbide tubes SC therein, then through the passageway at the right into the recuperator R-2 around the silicon carbide tubes therein and then into the stack flue C-1.

The air required for combustion in the floor heating flues enters the apparatus through the duct A-2 (see Fig. 2) and passes through duct D-8, from which it is distributed through the silicon carbide tubes SC in the recuperator R-2, where it is preheated, and then passes into the duct or passageway D-9 and is distributed therefrom into the silicon carbide tubes SC of the recuperator R-1, where the temperature is normally raised to about 1500° F. The air then passes from the tubes in the recuperator R-1 into the duct D-10, from which it passes into duct D-11 (see Figs. 2 and 8) and from thence to ducts D-12, then upward through ducts D-13, then upward through the lateral ducts or passageways D-14 (see Fig. 1) into the heating flues 1 to 9 inclusive, and 1-F to 9-F inclusive, under the oven floor.

The volume of preheated air to each floor heating flue may be regulated as desired by means of dampers D-15 (see Fig. 1), the air serving to support combustion of the oil or gas burned by the burners B-2 at the right end of the oven in Fig. 1, and B-3 at the left end of the oven, as shown in Fig. 1. Each of the oil burners B-2 and B-3 is operated under steam pressure and has an inspirator action, which not only causes forward flow of the preheated air, but also draws a large volume of hot waste gas from each floor heating flue through openings or ducts CF-2 (see Fig. 1) into the recirculation flue RC and causes the hot waste products to mix with the air in the duct D-14 (see Figs. 1 and 9) directly below each burner B-2 and B-3. At the inner end of the recirculation flues are projections PF (see Fig. 1) which extend upwardly into each heating flue and serve to deflect a volume of the hot waste gas into each recirculating flue RC.

For the purpose of giving those skilled in the art a better understanding of the novel recirculation flues embodying the present invention, a detailed description will be given in connection with the drawings generally and particularly in connection with Fig. 1 and Figs. 13 to 21. As pointed out hereinbefore, the heating flues only extend for one-half the length of the broad oven which facilitates the attainment and control of substantially uniform coking temperatures throughout the length of the floor of the oven and the avoidance of overheated ends near the burners with the production of hot spots and "burnt" or overcoked coke and of underheated areas near the center or middle of the oven with the production of cold spots and "green" or undercoked or underburnt coke. To provide a complete control of the combustion of the fuel in the heating flues and of the production and uniformity of heat and temperature therein, unique recirculation flues are arranged in combination with the heating flues and the heat recuperator or heat exchange system in a special manner, as will be fully described and explained hereinafter.

The structure of one embodiment of the recirculation system is illustrated in Figs. 1 and 13. A detailed enlarged view of the construction is shown in Fig. 18. It will be observed that divided heating flues are used with heating flues 1 to 9 extending for one-half the length of the oven from the left-hand side provided with burners B-3 to approximately the center or middle of the oven and with heating flues 1-F to 9-F extending for the other half of the oven from the right-hand side to approximately the center or middle. A bridge wall BW extends from the oven floor to a supporting arch SR in the recuperator structure and divides the right-hand heating flues from the left-hand heating flues. Underneath each divided or half heating flue is a recirculation flue RC. As may be seen from the drawings, particularly from Fig. 18, each recirculation flue is connected at both ends to its cooperating or superimposed heating flue located directly above. In the embodiment shown, each recirculation flue is in heat exchange relation with its cooperating or superimposed heating flue and is preferably separated only by a single refractory tile which constitutes the bottom of the heating flue and the top of the recirculation flue (see Fig. 2). At the outer ends of each recirculation flue adjacent to the right and left-hand sides of the new oven, connection is made with a hot air conduit or flue which conducts the preheated air from a recuperator to the burners at the ends of the heating flues and which permits or enables the merging of the stream of hot burnt gases being recirculated with the preheated air. By so doing, the flame from the burners is lengthened and the velocity of flame propagation is reduced. In this manner, substantially uniform heating is provided over substantially the entire oven floor for substantially the entire length thereof, thereby avoiding overheated ends of the oven and underheated centers or central areas. Some of the burnt gases from the combustion of fuel in the heating flues is withdrawn via a port PT which is adjacent the bridge wall BW and which is in connection with outlet ducts D-5 leading to the recuperators.

Figure 14:
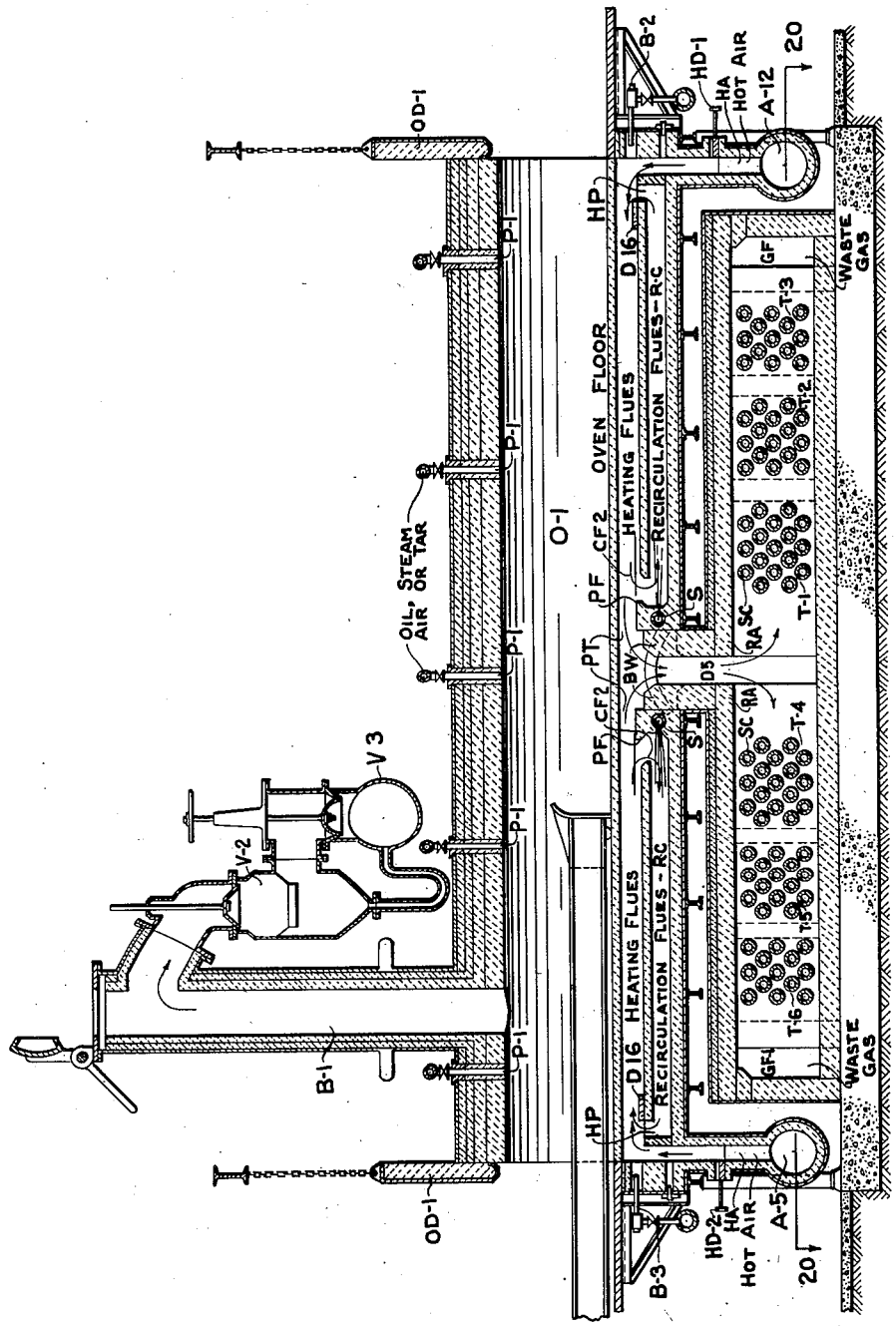

In the modified embodiment of the invention illustrated in Fig. 14, the floor heating flues 1 to 9 and 1F to 9F and recirculation flues RC serve the same purpose as that heretofore described for flues with the same reference numerals as illustrated in Fig. 1. An important difference, however, is that Fig. 1 shows the hot waste gas from the floor heating flues flowing downwardly through two vertical flues D-5 and D-6 which divide the flow of the gases into two streams flowing through upper horizontal tubular recuperators R-1 and R-3, then through tubular recuperators R-2 and R-4, and finally into one chimney flue C-1 to the waste gas stack, whereas Fig. 14 only provides one vertical waste gas flue D-5. The purpose of the special construction of the modified embodiment is to insure control of the temperature of the air to be preheated through the tubes in tubular recuperators T-1, T-2, and T-3 on the right side of the center line of the oven and through tubes in tubular recuperators T-4, T-5, and T-6 on the left side of the center line of the oven and to the burners. The preheated air from the recuperator tubes enters air ducts A-5 and A-12 (see Figs. 14 and 20) and passes through vertical flues HA to the heating flues. The volume of hot air to the heating flue burners is regulated by means of dampers HD and HD-2 in vertical flues HA. The other structural features of the modified oven are essentially the same as those illustrated in Fig. 1 and described heretofore, except no cracking chamber is provided and additions are made to the ends of the recirculation flues to provide for the use of gas as fuel. Thus, Fig. 14 shows the upper part of the oven without cracking flues which are not required when only coke, uncracked oil vapors, and gases are produced. In certain oil refineries, the operations are preferably conducted to charge heavy petroleum oil or residue into ovens solely for the production of recoverable and condensible oil vapors and to pipe these vapors directly into existing gasoline recovery towers. Under such conditions, the cracking flues can be omitted as clearly illustrated in the modified design shown in Fig. 14.

In Fig. 15, an arrangement of floor heating flues, recirculation flues, single waste gas flue D-5' and tubular recuperators T-1, T-2, T-3, T-4, T-5 and T-6 is identical to the combination illustrated in Fig. 14. The main difference is in the upper half of the oven and at the ends of the recirculation flues. In the oven illustrated in Fig. 14, the cracking flues have been omitted and the oven is to be used only for making combustible gases, condensible oil vapors and coke from oil residue, etc. from about 2 API to about 6 API grade, whereas the oven shown in Fig. 15 is to be used for calcining green petroleum coke or for coking coal or other solid carbonaceous material. Thus, Fig. 15 shows the upper part of the oven without the cracking flues but equipped with charging holes through which green petroleum coke or coal or other solid carbonaceous material can be charged into the coking chamber. In certain oil refineries, a large tonnage of petroleum coke of low specific density, high carbon content, and low ash is recovered. This is known as delayed coker coke and contains from about 10% to about 18% of volatile matter and is known as "green" petroleum coke. Such coke can be charged into the novel broad ovens and calcined to produce a coke with a high density (e. g. a real density of 2.+) and is suitable for the manufacture of electrodes for producing metals and alloys, particularly aluminum and particularly magnesium.

Fig. 16 and Fig. 17 illustrate the preferred designs of the brickwork forming the vertical waste gas flues D-5 and D-6 and also D-5'. The walls are so constructed as to prevent the brickwork walls BW, which are supported on recuperator arches RA, to expand vertically without lifting arch AR and walls FW which in turn support the silicon carbide oven floor tile. A detailed description of the preferred construction is as follows:

A space must be provided vertically and horizontally into which the lower brickwork can expand. The heating flue division walls FW are supported by arches AR. The thrust of the arches AR is taken into the skewbacks SK which are backed up by walls FW which extend from the supporting steel plate BP to the underside of the oven floor tile and in no way resting upon walls BW. The walls BW extend to the top of steel bottom plates BP which leaves space C between the top of wall BW and the lower side of arch AR.

In Figs. 17 and 19 the walls BW extend upwardly between the arches AR and terminate level with the bottom of the heating flues. Space CS provides for expansion of the brickwork between the extended walls BW and each side of all arches AR (see Fig. 1) located at the inner end of the recirculation flues. Projectors PF extend upwardly into each heating flue.

Fig. 18 shows a vertical section through the oven floor heating flues 1 to 9 and 1F to 9F, recirculation flues RC, the two waste gas flues D-5 and D-6 connecting the floor heating flues with the tubular recuperators R-1, R-2, R-3, and R-4 and burners B-2 and B-3 as in oven illustrated in Fig. 1. The volume of preheated air to each burner is controlled by sliding damper D15. The volume of hot gases being recirculated to each heating flue adjacent to each burner is controlled by sliding damper D-16.

The purpose of the recirculation flues is to provide a structure in which by means of inspirating oil or gas burners a large portion of the hot waste gases from the oven floor heating flues can be recirculated through and around the flames from the floor burners to reduce the high flame temperature at the burners and at the same time to lengthen the flame by controlling the volume of preheated air to each burner, as excess air will produce a short, very hot flame near the burner tips. Inspirating burners cause suction and induce a flow of hot waste gas from the heating flues to flow through openings CF-2 into the recirculation flues RC. The deflection of the hot gas into the recirculation flues is assisted by the projectors PF. The recirculation of the hot waste gases as described and illustrated in the drawings, especially Figs. 1, 13, and 18 through recirculation flues RC is induced in large volume whenever fuel oil is injected under steam pressure through burners B-2 and B-3. Satisfactory results have been obtained by recirculating a volume of hot burnt gases equal to about one-half of the total volume produced. The proportions can be varied in accordance with particular conditions as those skilled in the art will readily appreciate.

In the operation of the ovens, as illustrated in Fig. 14 for heat treating heavy oil and in Fig. 15 for calcining green petroleum coke or the coking of coal or other carbonaceous material, where it is desirable to use gas for heating the oven floors, the fuel gas injected at moderate pressures does not have sufficient suction action to draw the required volume of hot products of combustion through ports HP of the recirculation system (see Figs. 14, 15, and 19) without additional suction. Such additional suction can be provided by means of injecting combustible gas, dry steam, hot air or waste gas into the recirculation flues RC through pipes or inspirators S. By adjusting the suction, a volume of hot burnt gases equal to about one-half of the total volume can be recirculated. As those skilled in the art understand, the foregoing results can be achieved by varying the cross sectional areas of the heating flues, recirculation flues, etc. and by varying the velocities of the streams of burning fuel and hot burnt gases, the pre-heated air, and the recirculated gases. While the cross sectional areas of the heating flues and the recirculation flues are usually about the same, it is preferred to have the area of the latter slightly smaller, especially when inspirators S are employed.

The regulated flow of hot waste products is best described as follows in connection with Figs. 14, 15, and 19: The hot products are induced to flow upward from recirculation flues RC through ports HP by the inspirating action of the fuel gas from burners B-2 and B-3 where it mixes with hot air from hot air risers HA. The recirculation of the hot gases is further induced by the jet action of the dry steam, combustible gas, waste gas or hot air from pipes S into the recirculation flues RC. The jet action draws the hot products from the oven heating flues through opening CF-2. The volume of hot products recirculated is regulated by slide dampers D-16. Projections CF-2 serve to deflect the hot gas into the openings CF-2. Broadly stated, the cross sectional areas of the floor heating flue and the recirculation flue are about 90 square inches each and about 52 square inches each respectively. With such areas, satisfactory results have been obtained by using gas velocities of about 35 linear feet per second for the hot waste products which insures a rapid transfer of heat through the silicon carbide floor and which removes stagnant films of waste gases from the under surface of the floor. The velocity of the recirculated gases is adjusted as fast as can be obtained so as not to lose much of the sensible heat of the waste hot products before they are returned to the burners at the inner end of the floor heating flues.

In Fig. 19, the arrangement of heating flues and recirculation flues, inspirating burners and waste gas deflectors PF is identical with that illustrated in Fig. 18, except for the single waste gas flue D-5'.

The improved method embodying the present invention may be carried out in any appropriate oven. For instance, a structure such as the one described and illustrated in my co-pending application Serial No. 510,760 [now U. S. Patent No. 2,410,074] may be used, but it is preferred to use the oven described and illustrated in my parent application, Serial No. 597,028 [now U. S. Patent No. 2,426,612]. In the latter oven having a novel system of oil vapor cracking flues located directly over separate heating flues arranged longitudinally of the vapor flues and the oven, the value of the improved method has been demonstrated in actual practice in the cracking and coking of carbonaceous materials, particularly fluid, plastic or solid hydrocarbon masses, such as, tar, pitch, heavy residues, oil, petroleum, gilsonite, asphalt, hard oil residues of Aruba (Venezuela), oil residues, and acid refinery sludges.

The following is a brief description of the operation of the preferred embodiment of my invention when applied to the heat treatment of residue oil known as Dubbs API gravity heavy residuum oil, for example, for the production of either electrode coke or domestic coke from the carbon content of the heavy oil, in heat-treating the oil vapors for the recovery of aromatic oils, such as benzol, toluol, xylol, and solvent naphtha. The heavy oil, or oil tar, is preferably pre-heated to about 700° F. and is then continuously sprayed into the coking chamber at various points through ports P-1. The oil rapidly covers the entire oven floor or the carbonized residue thereon, and vaporization of the hot oil begins substantially immediately, together with the carbonizing of the residue and the pyrolytic treatment of the oil vapors proceeds, as described.

The process can be advantageously conducted using, for example, a six-hour operating cycle divided substantially as follows: The oven can be maintained "on stream," that is, with oil being continuously fed into the oven, during a period of about four and one-half hours; the time required for coking is about five hours, including the time that the oven is "on stream"; and the time required for pushing the coke from the oven and for luting or sealing the oven doors and burning the deposited carbon in the cracking flues is about thirty minutes, thus requiring substantially six hours to complete the cycle. The carbon which is deposited over the surfaces of the vapor cracking flues during the cracking operation is quite fluffy and is readily burned off by blowing air into each vapor cracking flue through pipes A-1 (see Figs. 1 and 5) during the last thirty minutes of operation of the cycle. The coke which is produced has a true specific gravity, as distinguished from the apparent specific gravity, of about 2.0, or more, and may contain from upwards of about 90 to about 96 or 98% or so of fixed carbon, together with a small amount of volatile matter, and up to about 0.5% of ash. The following specification has been satisfied by my coke:

| Constituent | Maximum Percentage |
|---|---|
| Moisture | 0.0 |
| Volatile Matter | 0.5 |
| Ash | 0.45 |
| Silicon | 0.06 |
| Iron | 0.06 |
| Calcium | 0.00 |
| Sulphur | 0.40 |
| Soluble Salts | 0.05 |
| Carbon | 98.48 |
| Total | 100.00 |
| Real density or true specific gravity minimum | 2.00 |

In the coking of any carbonaceous material, a certain percentage of fine or small particles of coke, known as breeze, is produced. This breeze is mixed with the petroleum residue referred to hereinbefore and is coked as previously described. The product can be sold as electrode coke or as a fuel.

The control of the floor temperature of the oven is necessary in order to satisfactorily regulate the steps of the process from the point at which the oil, tar, or the like is sprayed over the oven floor surface. In order to maintain control of the oven floor temperature, the gas to the burners in the heating flues 1 to 9, and 1-F to 9-F, under the floor of the oven is reduced in volume so as to reduce the temperature of the floor from about 2000° F. to about 1350° F. The temperature of the oven floor drops rapidly as the volume of fuel gas is reduced, and as the oil covers the floor of the oven, the volume of fuel gas or fuel to the heating flues is increased. Furthermore, as the depth of the coke over the floor of the oven increases, more fuel is used at the burners to raise the temperature as required for coking the incoming oil which is being deposited, until at the end of the oil input, when the coke bed is about seven inches thick on the average, then the temperature in the heating flues is raised to an average of about 2750° F. which is necessary to complete the coking and calcining of the oil carbon residue on the top surface of the coke.

In the operation of the new broad coking oven, it is first put "on stream" for an eight-hour cycle and oil is introduced, pumped or sprayed onto the silicon carbide floor of the oven, which has an initial temperature of about 1350° F. When the oil contacts the hot floor, it is vaporized. By continuing the heating, oil vapors are evolved and the residue is carbonized to coke. Although the oven floor has a minimum temperature of about 1350° F., the oil vapors have an average temperature of about 900° F. During the "on stream" period, analyses of the oil vapors were made from samples taken from the oven chambers at various intervals. The following are the analyses of gas samples taken forty minutes after the start of the eight-hour cycle (column "A"), three hours after putting "on stream" (column "B"), and six hours after the start (column "C"):

*Table I*

| Constituent | "A" | "B" | "C" |
|---|---|---|---|
| Carbon Dioxide ($CO_2$) percent | 0.2 | 0.2 | 0.4 |
| Butylene ($C_4H_8$) do | 1.8 | 0.8 | 1.3 |
| Propylene ($C_3H_6$) do | 8.1 | 2.7 | 6.1 |
| Ethylene ($C_2H_6$) do | 9.0 | 2.9 | 6.7 |
| Hydrogen ($H_2$) do | 29.4 | 51.8 | 44.9 |
| Carbon Monoxide (CO) do | 0.7 | 0.6 | 0.9 |
| Ethane ($C_2H_6$) do | 14.0 | 6.7 | 6.1 |
| Methane ($CH_4$) do | 36.8 | 34.3 | 33.6 |
| | 100.0 | 100.0 | 100.0 |
| Specific Gravity | 62.1 | 34.8 | 47.5 |
| B. t. u./cu. ft., Calculated | 1,113 | 772 | 891 |

All of the gas and oil vapors are drawn or sucked from the oven (see Fig. 1) upwardly in substantially equal regulated volumes through the cracking flues VF-1. In the cracking flues, the vapors are cracked by heat emanating from independent auxiliary combustion flues CF-1 at regulated and independently controlled temperatures which are higher than those of the gases leaving the oven and of the upper part of the oven. These independently controlled cracking temperatures are of the order of about 1350° F. to about 1400° F. The cracked vapors flow into a vapor up-take B-1, through oil scrubber V-2 and finally into vapor or gas main V-3. The analyses of the cracked vapors are as follows:

*Table II*

| Constituent | Weight Percent |
| --- | --- |
| $CO_2$ | 0.189 |
| $CO$ | 0.919 |
| $O_2$ | 0.397 |
| $H_2$ | 0.969 |
| $N_2$ | 2.659 |
| $CH_4$ | 14.859 |
| $C_2H_4$ | 6.233 |
| $C_2H_6$ | 4.605 |
| $C_3H_6$ | 5.375 |
| $C_4H_8$ | 2.496 |
| $C_5H_{10}$ | 0.952 |
| $C_6H_{12}$ | 0.979 |
| $C_7H_{14}$ | 0.409 |
| Benzol | 3.874 |
| Toluol | 2.540 |
| Xylol | 1.830 |
| Light Naphtha | 1.039 |
| Heavy Naphtha | 0.844 |
| Naphthalene "cut" | 0.677 |
| Tar | 48.155 |
| Total | 100.000 |

The yields per 1000 cubic feet of cracked vapor or gas are as follows:

*Table III*

| Constituents | Per M C. F Gas | Volume Percent | Weight Percent | ° API | Sp. Gr. | Lbs./Gal. |
| --- | --- | --- | --- | --- | --- | --- |
| Oven Feed | 17.8 Gal | | 100.000 | 8.4 | 1.011 | 8.423 |
| Vapor (gas) | 1,000 | | 33.537 | | 0.6573 | |
| Benzol | 0.7423 Gal | 9.306 | 3.535 | | 0.857 | 7.14 |
| Toluol | 0.4366 Gal | 5.473 | 2.096 | | .864 | 7.20 |
| Xylol | 0.3103 Gal | 3.889 | 1.511 | | .876 | 7.30 |
| Light Naphtha | 0.1710 Gal | 2.143 | 0.858 | | .903 | 7.522 |
| Heavy Naphtha | 0.1358 Gal | 1.702 | 0.696 | | .923 | 7.689 |
| Naphthalene "cut" | 0.978 Gal | 1.226 | 0.559 | | 1.028 | 8.564 |
| Tar | 6.0842 Gal | 76.261 | 39.748 | | 1.176 | 9.795 |
| Coke | 22.685 lbs | | 15.130 | | | |
| Losses: | | | | | | |
| Screenings | | | 0.370 | | | |
| Carbon Burned | | | 0.320 | | | |
| Water not recovered | | | 0.230 | | | |
| Unaccounted for | | | 1.410 | | | |
| Total | | 100.000 | 100.000 | | | |

In order to produce the foregoing yields, average high temperatures of the order of 1400° F. are required as well as high space velocities and large surface contact areas. The new broad oven structure is the only broad oven in which the foregoing yields can be obtained.

The yield of about 6.084 gallons of tar per 1000 cubic feet of oil gas, as noted in Table III, is preferably returned to the ovens, independent of the oil feed stock and is converted into coke and by-products. In other words, whenever the oil tar stock reaches, say about 600,000 gallons, four of the new broad ovens are preferably used exclusively for coking the oil tar. The following are the results from a ten-day operation per day when operating with three new broad ovens:

*Table IV*

| Items | Amount |
| --- | --- |
| Tar charged to three ovens | 26,851 Gallons. |
| Gas produced, M C. F | 877 M C. F. |
| Tar charged to oven per M C. F | 30.61 Gallons/M C. F. |
| Coke produced | 104,000 Pounds. |
| Coke produced per M C. F | 119 Pounds/M C. F. |
| Light oil produced | 1,428 Gallons. |
| Light oil produced per M C. F | 1.68 Gallons/M C. F. |
| Creosote oil produced | 6,610 Gallons. |
| Creosote oil produced per M C. F | 7.6 Gallons/M C F. |
| B. t. u. of gas made (average) | 750 B. t. u./cu. ft. |
| Percent weight recovery | 83%. |

Referring now more particularly to the production of aromatic hydrocarbons from the straight chain hydrocarbons evolved in the oven during the distillation process, it has been found in actual practice in a broad oven of my invention that the exothermic reaction temperature relating to the conversion of straight chain hydrocarbons to aromatic hydrocarbons will average about 1350° F., and that contact of the oil vapors with the hot surfaces of the cracking flues VF-1 is required in order to bring about the conversion of straight chain hydrocarbons into aromatic hydrocarbons. To insure contact of the hot hydrocarbon vapors with the hot cracking and heat-treating surfaces of the cracking flues, means are provided on the surfaces thereof for causing turbulence of the hot oil vapors. To provide for a temperature of about 1350° F. to 1400° F. within the cracking flues VF-1, the floor and side walls of each of the vapor flues are preferably constructed of silicon carbide in order to attain almost instantaneous transfer of heat to the oil vapors, and to maintain the required uniform temperature of the vapor contacting surfaces. It has been found as a result of experiments and tests that it is necessary to cause the hydrocarbon vapors to intimately contact the hot surfaces of the oil cracking flues in order to effect the conversion of straight chain hydrocarbons into the desired aromatic hydrocarbons. The upper heating system heretofore described, including the superimposed vapor cracking flues, has been designedly incorporated in connection with the oven structure of my invention as a means of heating each vapor cracking flue by means of heat radiated into each vapor cracking flue. By means of the structure as shown and described, turbulence of the oil vapors in passing through the oil vapor cracking flues is produced, resulting in the intimate contact of the oil vapors with the hot wall surfaces.

Fig. 20 is a plan view taken on the line 20—20 of Fig. 14 and Fig. 15. This figure illustrates the flow of the hot waste gases from the oven floor heating flues through the tubular recuperators to separate waste gas stacks as well as the flow of the air through the silicon carbide recuperator tubes to the oven floor burners. The waste gas from heating flues 1 to 9 and 1F to 9F flow downwardly through vertical flue D-5, Fig. 14, Fig. 15, and Fig. 19, to the right around the recuperator tubes T-1, T-2, and T-3 to chimney flue G-F to the waste gas stack S. Waste gases also flow to the left around recuperator tubes T-4, T-5, and T-6 to waste gas flue GF-1 to stack ST. The equal flow of waste gas to stack ST may be controlled by means of a mechanical draft ejector WE located in the stack and valves DW and DW-1 as may be clearly seen in Fig. 21. The air to be preheated enters air inlet A-7 and distributing flue A-8 (see Fig. 20) from where it flows through all of the recuperator tubes in tube assembly T-3, thence to distributing flue A-9, through tube assembly T-2, distributing flue A-10, through tube assembly T-1, air flue A-11, air pipe A-12, risers HA (see Fig. 14 and Fig. 15) to oven floor burners B-2.

The air from the atmosphere to be preheated on the left-hand side enters the distributing flue A-1, tube assembly T-6, flue A-2, tube assembly T-5, flue A-3, tube assembly T-4, flue A-4, flue A-5, and passes to vertical air flues HA (Fig. 14 and Fig. 15) and thence to the oven floor burners B-3. It is to be noted that the air circulation through the tube assemblies is discharged from tube assemblies T-1 and T-4 which are located near hot waste gas flues D-5 thus insuring a high preheat of the air. The volume of the pre-heated air from tube assembly T-1 and T-4 can be controlled to either burners B-2 or B-3 by regulating either dampers HD-1 or HD-2 (see Fig. 21). All of the pre-heated air can be shut off from either the B-2 or B-3 burners by closing damper D. In daily operation, damper D remains open as well as dampers HD-1 and HD-2. In the event that a recuperator assembly has to be shut down, cold air can be supplied to burners B-2 and B-3 through air pipes HA-1 and HA-2.

Whenever an oven is required of small capacity, the novel oven design will generally be the same except for the width and length of the oven. In such a case, only one set of recuperator tubes will be required under each oven and only one stack will be required to handle the waste gases from the oven heating flues and the associated recuperator set. The preheated air will be distributed to the burners at each side of the oven through flues A-5 and A-12 to risers HA as illustrated in Fig. 20.

Those skilled in the art may obtain a better understanding of the novel method embodying the present invention from the following description taken in conjunction with Fig. 21. The carbonaceous material, such as oil residue, tar, pitch, coal, etc. is charged into a sealed broad chamber via appropriate means, such as charging holes CH. A thin broad layer of material having a depth smaller than its width and a width smaller than its length is formed in said sealed chamber. When fluid material is under treatment, such as oil residue, tar, pitch, etc., it is usually and preferably pre-heated to an elevated temperature, say about 250° F. to about 700° F. After charging, heat is supplied underneath said thin, broad layer of carbonaceous material via heating flues located directly beneath the floor of the chamber. By making the floor and heating flues of silicon carbide, I have found that I can effect a very rapid transfer of heat and can produce selected high temperatures desirable for the effective distillation of the volatiles, such as hydrocarbon vapors, gases, etc. from the carbonaceous material and also for carbonizing the residue to a valuable coke having properties which make it useful for use in metallurgical operations, chemical industries, power plants, and household stoves, furnaces, etc.

It has been discovered that a novel combination of operations makes it possible to obtain the unique heating effects by utilizing a long hot flame which gives substantially uniform heat throughout the length of the heating flues and the floor of the chamber. The prior art shortcoming of having overheating near the ends of the ovens adjacent to the burners and underheating around the center of the oven is overcome by the use of the present invention. The new results are obtained by the utilization of a continuous, unidirectional flow of burning gases or fuel, air, and hot waste products of combustion and of the recirculation of a portion of the hot waste products through the heating flues with the incoming pre-heated air and fuel and the burning gases.

Air from the atmosphere is preferably introduced into the heating system by means of one or more air blowers AB (see Fig. 21). It is preferred to cause the stream or streams of incoming air to flow through a plurality of tubular recuperators, preferably made of silicon carbide to facilitate rapid heat transfer and to effect quick pre-heating of said air. The hot air preheated in the recuperator tubes is lead through conducting flues to a plurality of burners B-2 associated with heating flues which are preferably of the longitudinal type. Tests have demonstrated that satisfactory results are secured by using half heating flues which extend from one end to about the center of the sealed chamber or oven. By so doing, the heating system is divided into a right-hand section and a left-hand section as is clearly seen from Fig. 21. Thus, air from air blower AB goes through flues A-7 and A-8 to recuperator tubes T-3, flue A-9, recuperator tubes T-2, flue A-10 and recuperator tubes T-1, flue A-11 to hot air duct A-12 to air risers HA to burners B-2 for combustion in heating flues 1-F to 9-F. The hot waste gases or products of combustion flow through the heating flues into waste gas duct D-5 around the outside of the recuperator tubes T-1, T-2, and T-3 to waste gas flue G-F to stack ST. With the continuous, unidirectional, flow of burning gases, air, and hot waste gases, a portion of the latter is recirculated through recirculation flues associated with the heating flues. By adjusting dampers, injectors, etc., the portion recirculated can be controlled to a desired or selected volume.

The flow of gases and air in the left-hand section is similar to the right-hand section described heretofore. Thus, air is drawn from the atmosphere by blower AB-1 and is forced through flues A and A-1, recuperator tubes T-6, flue A-2, recuperator tubes T-5, flue A-3, recuperator tubes T-4 and flue A-4 to hot air duct A-5 and risers HA to a plurality of burners B-3 for combustion of fuel in heating flues 1 to 9.

Simultaneously, the hot gases or waste products of combustion flow through the heating flues 1 to 9 into a common waste duct D-5 around the recuperator tubes T-4, T-5, and T-6 to waste gas flue GF-1 to stack ST.

The waste gases from the heating system are handled by means of ejector WE which is provided with air blower AB-2 which provides a constant suction for the hot waste gases from flues GF and GF-1. The volume of waste gases from duct D-5 through recuperators T-1, T-2, and T-3 is controlled by operating damper DW in waste gas flue GF. Simultaneously, the volume of waste gases from duct D-5 through recuperators T-4, T-5, and T-6 is controlled by operating damper DW-1 in waste gas flue GF-1.

In a similar manner, hot air to heating flues 1-F to 9-F is controlled by air dampers HD-1 on the right-hand side and dampers HD-2 on the left-hand side of the oven. In order to obtain the highest exchange of sensible heat from hot waste gases to the incoming air, recuperator tubes are provided and the final heating of the incoming air takes place in recuperator tubes T-1 and T-4 where the outgoing hot waste gases are at their highest temperature.

The flow of hot air to either the right or left-hand sections of the oven simultaneously from recuperators T-1 and T-4 can be arranged by opening damper AD which separates hot air flues A-5 and A-12. For flexibility in case of repairs to the recuperators on either side of the oven are dampers AD-1 or AD-2 which may be opened or closed as required to obtain hot air from flue A-5 or A-12 to burners B-2 or B-3 at opposite sides of the oven as required.

The present invention provides a new design of a cracking and coking oven, which in actual practice can be from about thirty to forty feet long at the inside, between the oven doors OD-1, i. e., from the pusher end door to the discharge end of the oven, about 10½ feet in width, and about 2½ feet in height at the spring line of the arch over the coking chamber and about 4 feet 8 inches in height under the arch at the center of the oven. The heating flues of the cracking chamber preferably have a free cross-sectional area of about 100 square inches. It will be understood that although the cracking chamber VF-1 is heated in part from the heat coming from the oven O-1, the independent heating flues CF-1 provide the additional heat required for the cracking and heat-treating of the hydrocarbon vapors. Each separate heating flue is also preferably provided with a means of control for the amount of fuel to be burned by means of the burners B-4, and thus of the amount of heat evolved for radiation and conduction to the vapors in the vapor cracking flues VF-1.

In carrying the process into practice, the temperature of the floor and walls of the cracking flues are preferably maintained at about 1800° F., thus providing a cracking flue temperature of about 1350° F. to 1400° F. for the conversion of straight chain hydrocarbons to aromatic hydrocarbons, such as light oils, from which benzol, toluol, and xylol can be obtained.

For the purpose of evolving hydrocarbon vapors from the oil residues, tar, and the like, in the oven O-1, a controlled amount of heat is supplied by the heating flue system under the oven floor, especially constructed of silicon carbide, and any desired number of heating flues may be employed as may be required in any given installation.

The theory underlying the pyrolysis of hydrocarbons is not completely understood at the present time and the mechanism of the chemical reactions involved is very complex. In the conversion of hydrocarbons, a variety of reactions occurs including decomposition, polymerization, and side reactions. The aforesaid reactions include those of the endothermic type as well as those of the exothermic type. Generally speaking, the decomposition of hydrocarbons belongs to the endothermic type, whereas those relating to polymerization belong to the exothermic type. In the conversion of straight chain hydrocarbons to aromatic hydrocarbons, it appears that the first reactions are of the decomposition variety and are subsequently followed by those of a polymerizing variety which may also be accompanied with various side reactions. Although many factors are involved, it appears that the more important are temperature, time or space velocity, turbulence of the vapors, pressure, concentration, and contacting surfaces. Under certain conditions, including the use of appropriate catalysts, such products as butadiene and other hydrocarbons may be formed. By controlling the conditions in the cracking and heat-treating chamber a variety of products can be produced. It is understood, however, that the present invention is not to be restricted to and dependent upon any theory including the foregoing.

Although the present invention has been disclosed in connection with a preferred embodiment thereof, variations and modifications may be resorted to by those skilled in the art without departing from the true spirit and scope of the invention as disclosed in the foregoing specification and defined by the appended claims. Thus, for instance, the present method, and the coking and cracking oven above described, may be used for coking and the distillation of coal tar and coal tar pitches, for the recovery of a variety of compounds including creosote and tar acids, and for the recovery of volatile products including volatile oils. Moreover, the novel process and oven heretofore described may be used for heating of oil shales and for the recovery of various by-products including oil and fractions thereof. In addition, various carbonaceous materials and mixtures can be treated, such as, coal, lignite, oil shale, peat, wood, activated carbon, mixtures of non-coking coal and tar, pitch or oil residue, mixtures of swelling and non-swelling coal, mixtures of coking coal and anthracite coal fines, mixtures of anthracite fines and tar, pitch or oil residues, and any other mixtures of solid carbonaceous materials and hydrocarbon masses. Furthermore, the process can also be operated on time cycles other than those specifically described, for example, the process can be operated on a six-hour cycle divided substantially as follows: The oven is maintained "on stream" (i. e. oil is continuously fed into the oven) during a period of about four hours. The time required for coking is about five and one-half hours including the time the oven is "on stream" and the time required for other operations including luting or sealing the oven doors, pushing the coke from the oven, and burning the deposited carbon in the cracking flues is about thirty minutes. The total time required is substantially six hours to complete the entire cycle.

The present application is a continuation-in-part of my co-pending application, Serial No.

754,566, filed June 13, 1947, now abandoned, and of my parent application, Serial No. 597,028, filed June 1, 1945 (now U. S. Patent No. 2,426,612).

I claim:

1. An improved broad coking oven adapted to pyrolytically treat carbonaceous material and evolve volatile vapors and gases and to carbonize the residue thereof into coke which comprises a broad coking oven having a substantial width greater than its low depth and smaller than its extended length, a plurality of heating flues located directly under said coking oven, a burner located at one end of each of said flues for burning fuel and for producing hot burnt gases and flames, at least one stack flue operatively connected with said heating flues, a projecting wall extending upwardly into each of said heating flues before connecting with said stack flue whereby a volume of hot burnt gases is deflected from each of said heating flues, and a recirculating flue operatively associated with each of said heating flues and extending from said projecting wall to the burner end of said heating flue for the recirculation of said deflected volume of hot burnt gases to each of said burners whereby the recirculated hot burnt gases are merged with the burning fuel to lengthen the flame from each burner, reduce the velocity of flame propagation, and provide substantially uniform heating over substantially the entire length of said coking ovens.

2. An improved board coking oven adapted to pyrolytically treat carbonaceous material and evolve volatile vapors and gases and to carbonize the residue thereof into coke which comprises a broad coking oven having a substantial width greater than its low depth and smaller than its extended length, a floor located in said oven and extending throughout substantially the entire length thereof, a plurality of longitudinal heating flues located directly under the floor of said coking oven, a burner located at one end of each of said longitudinal heating flues for burning fuel and for producing hot burnt gases and flames, at least one stack flue operatively connected with the end of each of said longitudinal heating flues remote from said burner, a projecting wall extending upwardly and located in each longitudinal heating flue before the connection with said stack flue for deflecting a volume of hot burnt gases before they reach said stack flue, a recirculating flue operatively associated with each of said longitudinal heating flues and extending from said projecting wall to the burner end of said longitudinal heating flue for the recirculation of said deflected volume of hot burnt gases to each of said burners, a heat exchange system connected to said stack flue and adapted to preheat incoming air with hot burnt gases coming from said longitudinal heating flues, a conduit for conducting said preheated air from said heat exchange system to each of said burners and for connecting with the end of each recirculating flue remote from said projecting wall whereby said preheated air is merged with said deflected volume of hot burnt gases and the flame from each burner is lengthened, the velocity of flame propagation is reduced and the heating of substantially the entire oven floor is effected substantially uniformly for substantially the entire length thereof thereby avoiding overheated ends of the oven and underheated central areas, and a waste gas stack connected to said heat exchange system for removing hot burnt gases.

3. An improved broad coking oven adapted to pyrolytically treat carbonaceous material and evolve volatile vapors and gases and to carbonize the residue thereof into coke which comprises a broad coking oven having a substantial width greater than its low depth and smaller than its extended length, a floor located in said broad oven and exending throughout substantially the entire length thereof, a plurality of longitudinal heating flues located directly under the floor of said board coking oven and extending from the right-hand side thereof to about the middle of the oven, another plurality of longitudinal heating flues located directly under the floor of said oven and extending from the left-hand side thereof to about the middle of the oven, at least one vertical stack flue located at about the middle of the oven and connected with the said right and left heating flues, a burner located at the outer end of each of said right and left heating flues for burning fuel and for producing hot burnt gases and flames, a projecting wall extending upwardly and located in each of said right and left heating flues in a region remote fom the burner end of each flue and ahead of the connection with said stack flue for deflecting a volume of hot burnt gases before they reach said stack flue, a recirculating flue operatively associated with each of said right and left heating flues and extending from said projecting wall to the burner end of each of said heating flues for the recirculation of said deflected volume of hot burnt gases to each of said burners, a waste gas stack connected to said stack flue for removing hot burnt gases, heat recuperating means located between said stack flue and said stack whereby hot burnt gases coming from said heating flue can be conducted directly via a short path for preheating air, and a conduit for conducting said air preheated in said heat recuperating means to each burner and for connecting with the burner end of each recirculating flue whereby said preheated air is merged with said deflected volume of hot burnt gases and the flame from each burner is lengthened, the velocity of flame propagation is reduced, and the heating of substantially the entire floor is effected substantially uniformly for substantially the entire length thereof thereby avoiding overheated ends of the oven and underheated central areas thereof.

4. An improved broad coking oven adapted to pyrolytically treat carbonaceous material and evolve volatile vapors and gases and to carbonize the residue thereof into coke which comprises a broad coking oven having a substantial width greater than its low depth and smaller than its extended length, a floor located in said broad oven and extending throughout substantially the entire length thereof, a plurality of longitudinal heating flues located directly under the floor of said broad coking oven, means dividing said heating flues about the middle of the oven to provide right heating flues extending from about the right side of the oven to about the middle and left heating flues extending from about the left side of the oven to about the middle thereby making each flue about one-half the length of the oven, arching means to carry the load of the aforesaid means to a sub-structure and thence to the foundation of the oven, at least one vertical stack flue located at about the middle of the oven and connected with the said right and left heating flues, a burner located at the outer end of each of said right and left heating flues for burning fuel and for producing hot burnt gases and flames, a projecting wall extending upwardly and located in each of said right and left heating flues in a region remote from the burner end of each flue and ahead of the connection with said stack flue for deflecting a volume of hot burnt gases before they reach said stack flue, a recirculating flue operatively associated with each of said right and left heating flues and extending from said projecting wall to the burner end of each of said heating flues for the recirculation of said deflected volume of hot burnt gases to each of said burners, a waste gas stack connected to said stack flue for removing hot burnt gases, heat recuperating means located between said stack flue and said stack whereby hot burnt gases coming from said heating flue can be conducted directly via a short path for preheating air, and a conduit for conducting said air preheated in said heat recuperating means to each burner and for connecting with the burner end of each recirculating flue whereby said preheated air is merged with said deflected volume of hot burnt gases and the flame from each burner is lengthened, the velocity of flame propagation is reduced, and the heating of substantially the entire floor is effected substantially uniformly for substantially the entire length thereof thereby avoiding overheated ends of the oven and underheated central areas thereof.

5. An improved broad coking oven adapted to pyrolytically treat carbonaceous material and evolve volatile vapors and gases and to carbonize the residue thereof into coke which comprises a broad coking oven having a substantial width greater than its low depth and smaller than its extended length, a floor located in said broad oven and extending throughout substantially the entire length thereof, a plurality of longitudinal heating flues located directly under the floor of said broad coking oven and extending from the right-hand side thereof to about the middle of the oven, another plurality of longitudinal heating flues located directly under the floor of said oven and extending from the left-hand side thereof to about the middle of the oven, a thin, highly heat conductive tile wall composed of silicon carbide and separating the bottom of each heating flue and its corresponding recirculating flue and adapted to facilitate a transfer of heat from the hot burnt and burning gases in the heating flues to the recirculating flues whereby the recirculated hot burnt gases are heated prior to their merging with preheated air flowing to the heating flues, at least one vertical stack flue located at about the middle of the oven and connected with the right and left heating flues, a burner located at the outer end of each of said right and left heating flues for burning fuel and for producing hot burnt gases and flames, a projecting wall extending upwardly and located in each of said right and left heating flues in a region remote from the burner end of each flue and ahead of the connection with said stack flue for deflecting a volume of hot burnt gases before they reach said stack flue, a recirculating flue operatively associated with each of said right and left heating flues and extending from said projecting wall to the burner end of each of said heating flues for the recirculation of said deflected volume of hot burnt gases to each of said burners, a waste gas stack connected to said stack flue for removing hot burnt gases, heat recuperating means located between said stack flue and said stack whereby hot burnt gases coming from said heating flue can be conducted directly via a short path for preheating air, and a conduit for conducting said air preheated in said heat recuperating means to each burner and for connecting with the burner end of each recirculating flue whereby said preheated air is merged with said deflected volume of hot burnt gases and the flame from each burner is lengthened, the velocity of flame propagation is reduced, and the heating of substantially the entire floor is effected substantially uniformly for substantially the entire length thereof thereby avoiding overheated ends of the oven and under-heated central areas thereof.

6. In a method of coking carbonaceous material involving sealing in a broad coking oven a charge of carbonaceous material as a flat, horizontal layer having a substantial width greater than its low depth and smaller than its extended length, establishing a plurality of main streams of hot burning fuel in heating flues beneath the charge of carbonaceous material from each end of said oven and extending longitudinally of the length of said charge to form streams of hot waste gases, heating said charge with said main streams to coke the carbonaceous material substantially uniformly throughout the same and to distill volatile hydrocarbons therefrom as hot vapors, conducting said main streams towards the middle of the charge, removing said streams of hot waste gases after heating the charge at about the middle thereof and away therefrom in a downward direction substantially perpendicular to the said horizontal layer, merging said downwardly flowing streams of hot gases as a stack stream going to a stack, and exchanging heat between said stack stream and incoming air to produce streams of preheated air to support the combustion of said hot burning fuel that improvement which comprises recirculating a portion of each of said main streams of hot waste gases before the same goes into the stack stream, injecting a fluid of the group consisting of combustible gas, steam, hot air and waste gas through an inspirator to provide suction for said recirculated portion of hot waste gases, and adjusting the suction effect of said injected fluid to control the volume of hot burnt gases to be added to the main streams to control the combustion of the burning fuel and to lengthen the flames thereof to reach the middle of the charge whereby substantially uniform heat is supplied to said charge and overheated ends and underheated centers in said charge are avoided.

7. In a method of coking carbonaceous material involving sealing in a broad coking oven a charge of carbonaceous material as a flat, horizontal layer having a substantial width greater than its low depth and smaller than its extended length, establishing a plurality of main streams of hot burning fuel in heating flues beneath the charge of carbonaceous material from each end of said oven and extending longitudinally about one-half of the length of said charge from each side to a central region to form streams of hot waste gases, heating said charge with said main streams to coke the carbonaceous material therein substantially uniformly throughout the same and to distill volatile hydrocarbons therefrom as hot vapors, conducting said main streams towards the central region of the charge, removing said streams of hot waste gases after heating the charge to about the central region thereof and away therefrom in a downward direction substantially perpendicular to the said horizontal layer, merging said downwardly flowing streams of hot gases as a stack stream going to a stack, and continuously effecting recuperation of heat between said stack stream and incoming air to produce a stream of preheated air to support the combustion of said hot burning fuel that improvement which comprises positively diverting a selected lower part of said main streams near the said central region to provide hot gases for streams for recirculation, returning said streams for recirculation towards the ends of the oven while transmitting heat thereto from the main streams through a separating wall of silicon carbide, injecting a fluid of the group consisting of combustible gas, steam, hot air, and waste gas through an inspirator to assist in returning said streams for recirculation towards the ends of the oven, and merging said recirculated streams with said main streams to control the combustion of the burning fuel and to lengthen the flames thereof whereby substantially uniform heat is supplied to said charge and overheated ends and underheated centers in said charge are avoided.

8. In a method of coking carbonaceous material involving sealing in a broad coking oven a charge of carbonaceous material as a flat, horizontal layer having a substantial width greater than its low depth and smaller than its extended length, establishing a plurality of main streams of hot burning fuel in heating flues beneath the charge of carbonaceous material from each end of said oven and extending longitudinally about one-half of the length of said charge from each side to a central region to form streams of hot waste gases, heating said charge with said main streams to coke the carbonaceous material therein substantially uniformly throughout the same and to distill volatile hydrocarbons therefrom as hot vapors, conducting said main streams towards the central region of the charge, removing said streams of hot waste gases after heating the charge to about the central region thereof and away therefrom in a downward direction substantially perpendicular to the said horizontal layer, merging said downwardly flowing streams of hot gases as a stack stream going to a stack, and continuously effecting recuperation of heat between said stack stream and incoming air to produce a stream of preheated air to support the combustion of said hot burning fuel that improvement which comprises recirculating a portion of each of said streams of hot waste gases before the same goes to the stack stream from a central region of the oven to each end thereof thereby providing a plurality of recirculating streams, injecting into each of said recirculating streams returning to each end of the oven a fluid of the group consisting of combustible gas, steam, hot air, and waste gas to assist in moving the recirculating stream away from the central region and toward each end of the oven, and merging said recirculating streams with said main streams to control the combustion of the burning fuel and to lengthen the flames thereof whereby substantially uniform heat is supplied to said charge and overheated ends and underheated centers in said charge are avoided.

9. In a method of coking carbonaceous material involving sealing in a broad coking oven a charge of carbonaceous material as a flat, horizontal layer having a substantial width greater than its low depth and smaller than its extended length, establishing a plurality of main streams of hot burning fuel in heating flues beneath the charge of carbonaceous material from each end of said oven and extending longitudinally about one-half of the length of said charge from each side to a central region to form streams of hot waste gases, heating said charge with said main streams to coke the carbonaceous material therein substantially uniformly throughout the same and to distill volatile hydrocarbons therefrom as hot vapors, conducting said main streams towards the central region of the charge, removing said streams of hot waste gases after heating the charge to about the central region thereof and away therefrom in a downward direction substantially perpendicular to the said horizontal layer, merging said downwardly flowing streams of hot gases as a stack stream going to a stack, and continuously effecting recuperation of heat between said stack stream and incoming air to produce a stream of preheated air to support the combustion of said hot burning fuel that improvement which comprises positively diverting a portion of each of said main streams of hot waste gases before the same goes to the stack stream near the central region of said oven to provide recirculating streams, returning said streams for the recirculation towards the ends of the oven, subjecting said recirculation streams to positive inspiration while causing the streams of preheated air to flow adjacent the ends of the oven and in operative relation with the recirculating streams to provide additional suction therefor, and merging said streams of preheated air and said recirculating streams with said main streams of hot burning fuel to control the combustion of the burning fuel and to lengthen the flames thereof whereby substantially uniform heat is supplied to said charge and overheated ends and underheated centers in said charge are avoided.

10. In a method of coking carbonaceous material involving sealing in a broad coking oven a charge of carbonaceous material as a flat, horizontal layer having a substantial width greater than its low depth and smaller than its extended length, establishing a plurality of main streams of hot burning fuel in heating flues beneath the charge of carbonaceous material from each end of said oven and extending longitudinally about one-half of the length of said charge from each side to a central region to form streams of hot waste gases, heating said charge with said main streams to coke the carbonaceous material therein substantially uniformly throughout the same and to distill volatile hydrocarbons therefrom as hot vapors, conducting said main streams towards the central region of the charge, removing said streams of hot waste gases after heating the charge to about the central region thereof and away therefrom in a downward direction substantially perpendicular to the said horizontal layer, merging said downwardly flowing streams of hot gases as a stack stream going to a stack, and continuously effecting recuperation of heat between said stack stream and incoming air to produce a stream of preheated air to support the combustion of said hot burning fuel that improvement which comprises positively diverting a portion of each of said main streams of hot waste gases before the same goes to the stack stream near the central region of said oven to provide streams for recirculation, returning said streams for recirculation towards the end of the oven, subjecting said recirculation streams to positive inspiration to assist in moving said streams for recirculation from the central region of the oven towards the ends thereof by means of fluid of the group consisting of combustible gas, steam, hot air and waste gas, and merging said recirculating streams with said main stream to control the combustion of the burning fuel and to lengthen the flames thereof whereby substantially uniform heat is supplied to said charge and overheated ends and underheated centers in said charge are avoided.

CHARLES H. HUGHES.

References Cited in the file of this patent

UNITED STATES PATENTS

| Number | Name | Date |
|---|---|---|
| 1,617,609 | Smith | Feb. 15, 1927 |
| 1,885,920 | Knowles et al. | Nov. 1, 1932 |
| 1,907,029 | Andrews et al. | May 2, 1933 |
| 2,114,018 | Frevert et al. | Apr. 12, 1938 |
| 2,116,641 | Reppekus | May 10, 1938 |
| 2,199,841 | Saleh | May 7, 1940 |
| 2,234,173 | Hughes | Mar. 11, 1941 |
| 2,267,447 | Curran | Dec. 23, 1941 |
| 2,309,957 | Hughes | Feb. 2, 1943 |
| 2,347,076 | Boynton et al. | Apr. 18, 1944 |
| 2,410,074 | Hughes | Oct. 29, 1946 |
| 2,426,612 | Hughes | Sept. 2, 1947 |